United States Patent
Hiraoka et al.

(10) Patent No.: US 11,836,457 B2
(45) Date of Patent: Dec. 5, 2023

(54) SIGNAL PROCESSING APPARATUS, COMMUNICATION SYSTEM, METHOD PERFORMED BY SIGNAL PROCESSING APPARATUS, STORAGE MEDIUM FOR SIGNAL PROCESSING APPARATUS, METHOD PERFORMED BY COMMUNICATION TERMINAL, AND STORAGE MEDIUM FOR COMMUNICATION TERMINAL TO RECEIVE TEXT DATA FROM ANOTHER COMMUNICATION TERMINAL IN RESPONSE TO A UNIQUE TEXTING COMPLETION NOTICE

(71) Applicant: Science Arts, Inc., Tokyo (JP)

(72) Inventors: Hidekazu Hiraoka, Tokyo (JP);
Kazuaki Okimoto, Hachioji (JP);
Katsumi Yokomichi, Tokyo (JP)

(73) Assignee: Science Arts, Inc.

( * ) Notice: Subject to any disclaimer, the term of this patent is extended or adjusted under 35 U.S.C. 154(b) by 0 days.

(21) Appl. No.: 18/090,618

(22) Filed: Dec. 29, 2022

(65) Prior Publication Data
US 2023/0153549 A1 May 18, 2023

Related U.S. Application Data

(60) Division of application No. 16/520,105, filed on Jul. 23, 2019, now Pat. No. 11,568,154, which is a
(Continued)

(30) Foreign Application Priority Data

Jun. 16, 2017 (JP) .................................. 2017-119046

(51) Int. Cl.
*G06F 40/58* (2020.01)
*G10L 15/00* (2013.01)
(Continued)

(52) U.S. Cl.
CPC ............ *G06F 40/58* (2020.01); *G10L 15/005* (2013.01); *G10L 15/26* (2013.01); *H04L 12/18* (2013.01);
(Continued)

(58) Field of Classification Search
CPC ....... G06F 40/58; G06F 3/162; G10L 15/005; G10L 15/26; G10L 13/00; H04L 51/063;
(Continued)

(56) References Cited

U.S. PATENT DOCUMENTS 6,651,042 B1    11/2003   Field et al.
7,236,580 B1     6/2007   Sarkar et al.
(Continued)

FOREIGN PATENT DOCUMENTS

CN        1636384 A      7/2005
CN      101632316 A      1/2010
(Continued)

OTHER PUBLICATIONS

International Search Report for PCT/JP2018/021725, dated Jul. 17, 2018 (4 pages).
(Continued)

*Primary Examiner* — Farzad Kazeminezhad
(74) *Attorney, Agent, or Firm* — Harness, Dickey & Pierce, P.L.C.

(57) ABSTRACT

According to one embodiment, a signal processing apparatus correlates a plurality of communication terminals as a group and enables one-to-many communications in the group. The signal processing apparatus includes processing circuitry. The processing circuitry assigns a transmission right to one of the communication terminals in the group. The processing circuitry generates text data based on voice data from said one of the communication terminals in possession of the transmission right. The processing cir-
(Continued)

cuitry gives a texting completion notice indicative of completion of texting processing to the communication terminals in the group. The processing circuitry transmits, after the texting completion notice is given, the generated text data to at least one of the communication terminals in the group.

13 Claims, 14 Drawing Sheets

Related U.S. Application Data continuation of application No. PCT/JP2018/021725, filed on Jun. 6, 2018.

(51) Int. Cl.
| | |
|---|---|
| G10L 15/26 | (2006.01) |
| H04L 51/063 | (2022.01) |
| B60T 7/22 | (2006.01) |
| H04M 3/56 | (2006.01) |
| G06Q 10/10 | (2023.01) |
| H04M 1/65 | (2006.01) |
| G06F 3/16 | (2006.01) |
| H04W 4/14 | (2009.01) |
| G10L 13/00 | (2006.01) |
| H04L 12/18 | (2006.01) |
| H04W 4/10 | (2009.01) |
| H04L 5/16 | (2006.01) |

(52) U.S. Cl.
 CPC .............. *H04M 3/568* (2013.01); *H04W 4/10* (2013.01); *H04L 5/16* (2013.01)

(58) Field of Classification Search
 CPC ......... B60T 7/22; H04M 3/56; H04M 1/6505; G06Q 10/103; H04W 4/14
 USPC .................. 704/235, 3, 257; 701/2; 709/206; 379/100.05; 455/414.1
 See application file for complete search history.

(56) References Cited

U.S. PATENT DOCUMENTS

| | | | |
|---|---|---|---|
| 11,568,154 B2 * | 1/2023 | Hiraoka | ................ H04M 3/566 |
| 2005/0144012 A1 | 6/2005 | Afrashteh et al. | |
| 2006/0035630 A1 | 2/2006 | Morishima et al. | |
| 2007/0088553 A1 | 4/2007 | Johnson | |
| 2007/0208813 A1 | 9/2007 | Blagsvedt et al. | |
| 2008/0207242 A1 | 8/2008 | Ekberg | |
| 2008/0220753 A1 | 9/2008 | Matsuda | |
| 2009/0135741 A1 | 5/2009 | Mykhalchuk et al. | |
| 2010/0063815 A1 | 3/2010 | Cloran et al. | |
| 2010/0158214 A1 | 6/2010 | Gravino et al. | |
| 2013/0102288 A1 | 4/2013 | Hussain et al. | |
| 2013/0226557 A1 | 8/2013 | Uszkoreit et al. | |
| 2013/0304457 A1 | 11/2013 | Kang et al. | |
| 2014/0180668 A1 | 6/2014 | Nasu et al. | |
| 2015/0154183 A1 | 6/2015 | Kristjansson et al. | |
| 2015/0336578 A1 | 11/2015 | Lord et al. | |

FOREIGN PATENT DOCUMENTS

| | | | |
|---|---|---|---|
| CN | 104285428 | A | 1/2015 |
| EP | 1928189 | A1 | 6/2008 |
| JP | 2001-083990 | A | 3/2001 |
| JP | 2006-050500 | A | 2/2006 |
| JP | 2007-165951 | A | 6/2007 |
| JP | 2008-219297 | A | 9/2008 |
| JP | 2008-227592 | A | 9/2008 |
| JP | 2013-009434 | A | 1/2013 |

OTHER PUBLICATIONS

Japanese Office Action for Japanese Application No. 2017-119046, dated Oct. 10, 2017 (9 pages).
International Preliminary Report on Patentability for PCT/JP2018/021725 dated Jun. 6, 2018 (in English) (6 pages).
English translation of International Preliminary Report on Patentability for PCT/JP2018/021725 dated Jun. 6, 2018.
Chinese Office Action dated Oct. 9, 2020 for Application No. 201880011278.5 with English tanslation (13 pages).
European Search Report for Application No. 18817755.4 dated Feb. 16, 2021 (16 pages).
Extended European Search Report dated May 20, 2021 for Application No. 18817755.4 (15 pages).
English translation of International Preliminary Report on Patentability for PCT/JP2018/021725 dated Jun. 6, 2018 (6 pages).

* cited by examiner

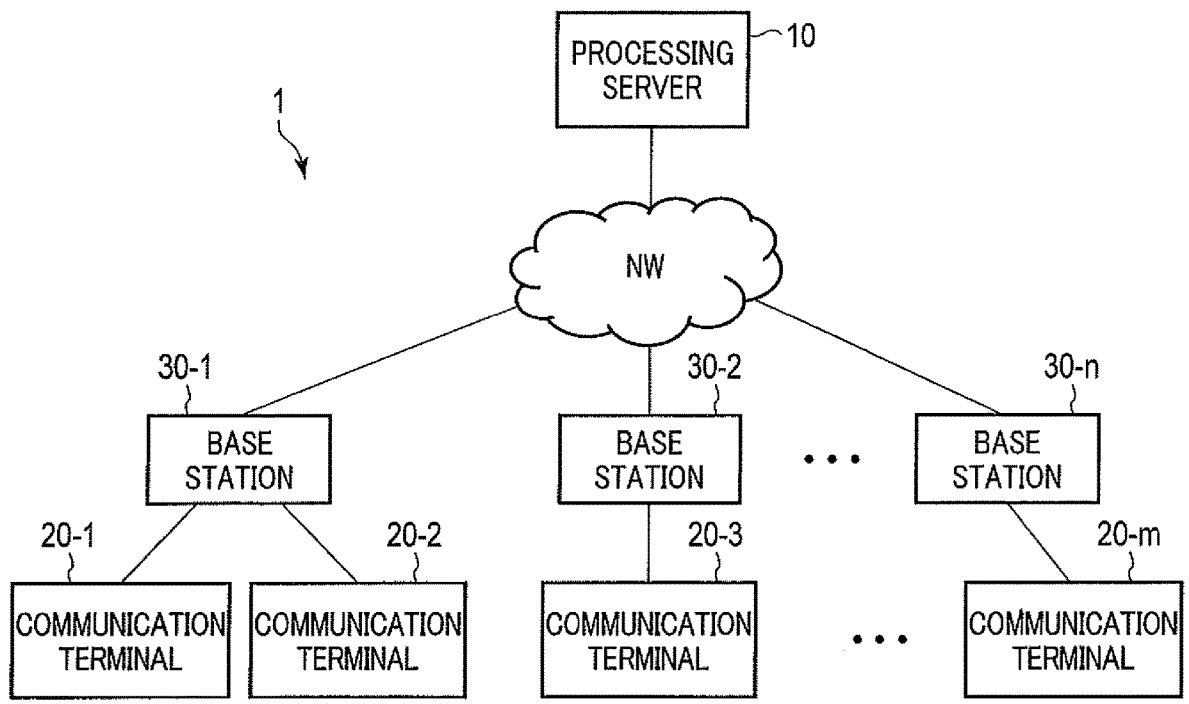
F I G. 1
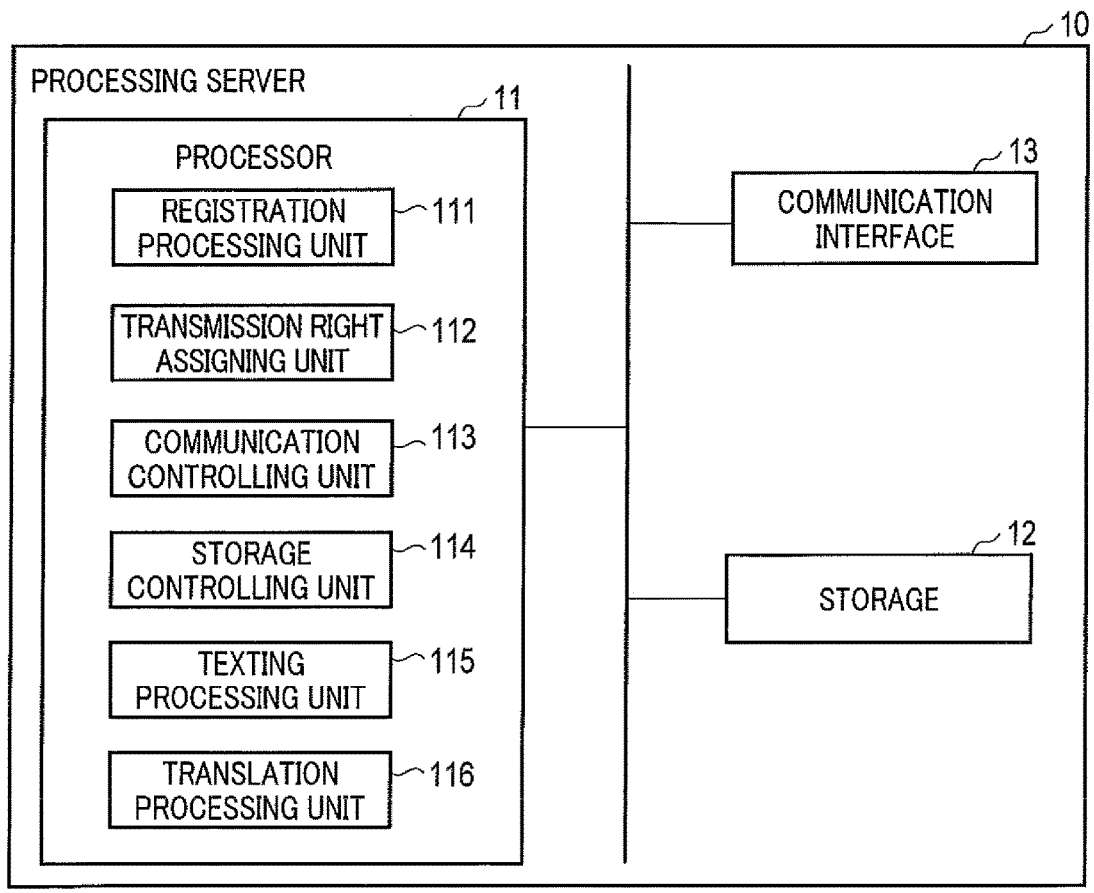
F I G. 2

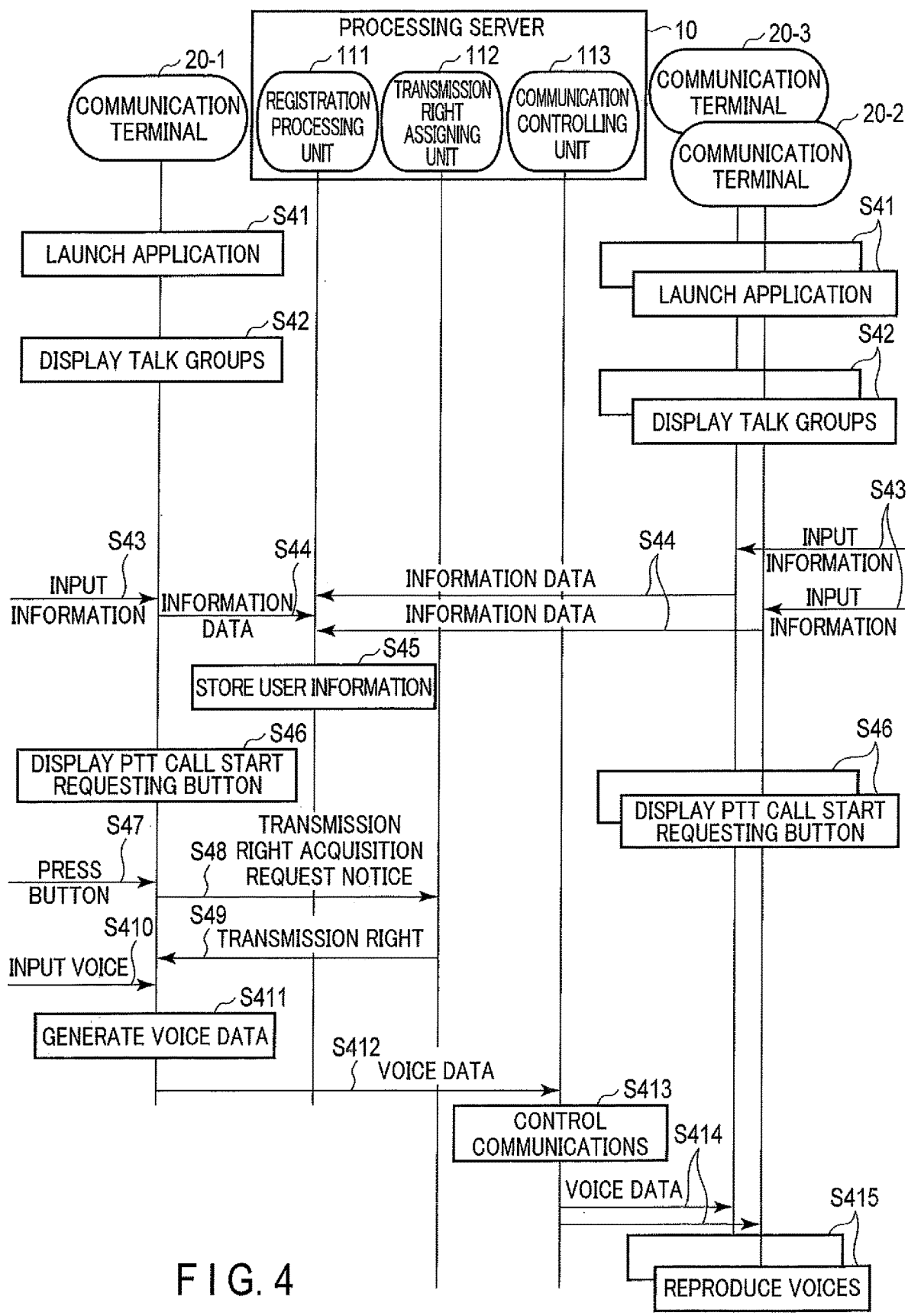
F I G. 4

| Talk Group ID | User ID |
|---|---|
| Group01 | User01 |
| | User02 |
| | User03 |
| | |
| Group02 | UserJ |
| | UserJ+1 |
| | |
| Group03 | UserK |
| | UserK+1 |
| | |

FIG. 5

| | | | |
|---|---|---|---|
| User01 | IP Address 01 | Language Code 01 | Location Information 01 |
| User02 | IP Address 02 | Language Code 01 | Location Information 02 |
| User03 | IP Address 03 | Language Code 02 | Location Information 03 |
| UserJ | IP Address J | Language Code 01 | Location Information J |
| UserJ+1 | IP Address J+1 | Language Code 02 | Location Information J+1 |
| UserK | IP Address K | Language Code 01 | Location Information K |
| UserK+1 | IP Address K+1 | Language Code 03 | Location Information K+1 |

FIG. 6

| TALK GROUP ID | CALLER ID | TIME STAMP (CALL START TIME) | DATA LENGTH | MAIN DATA |
|---|---|---|---|---|

FIG. 7

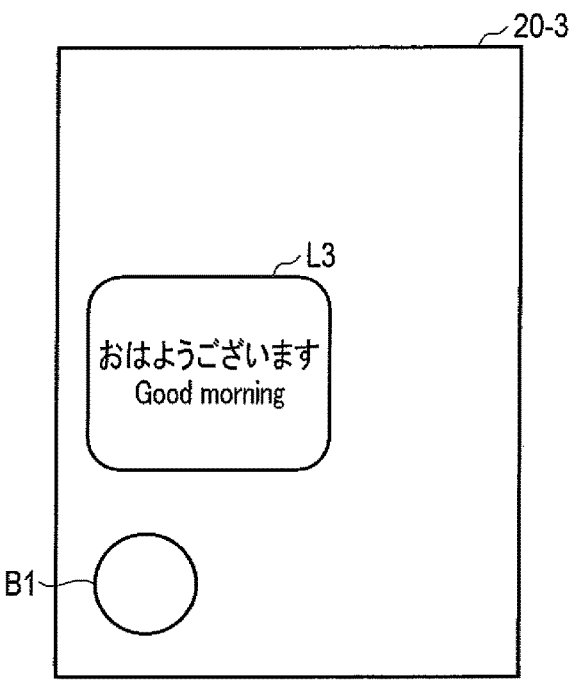
F I G. 15
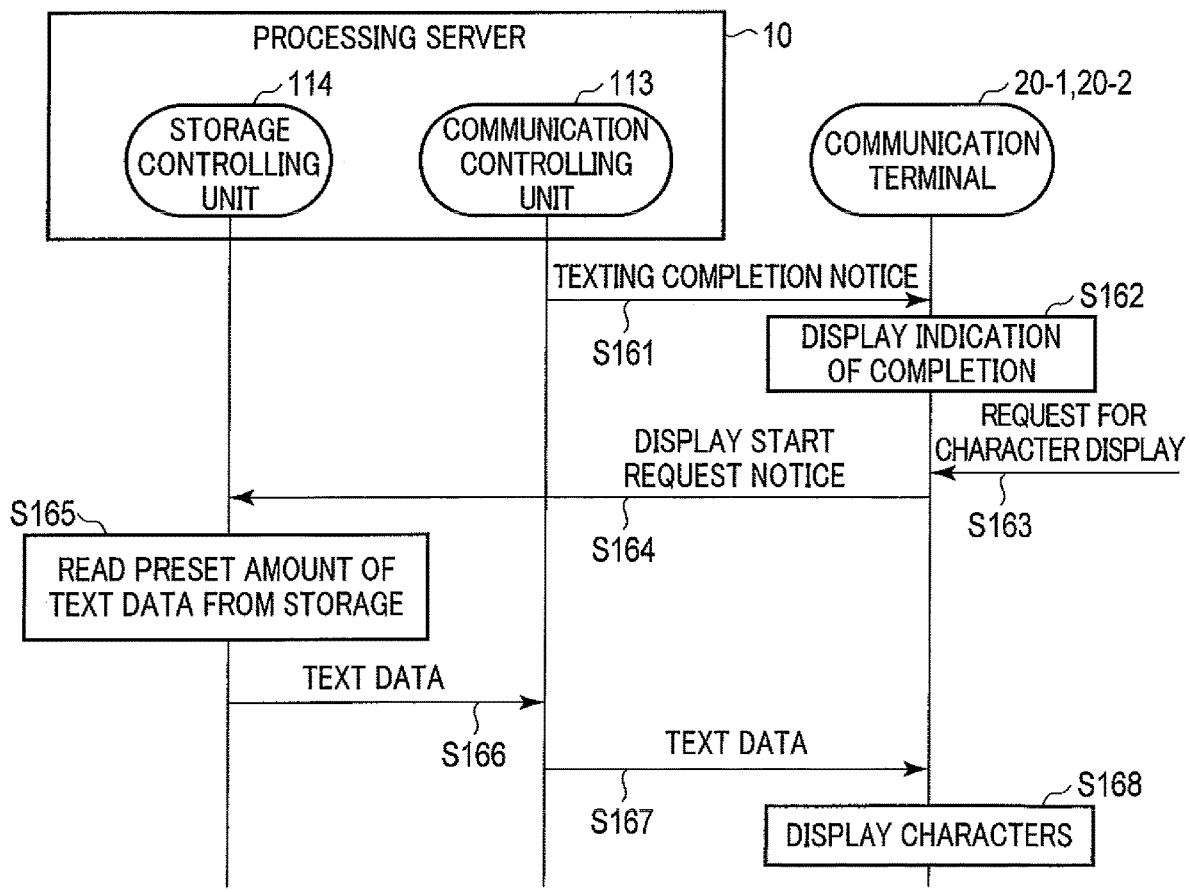
F I G. 16

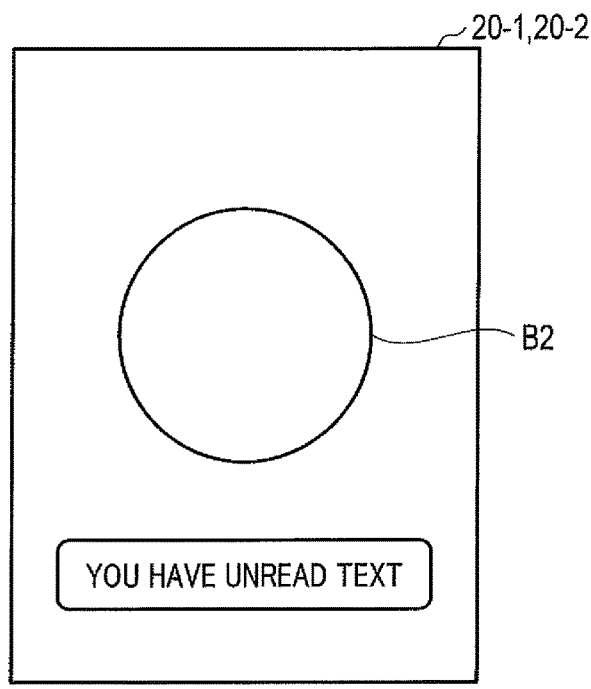
F I G. 17
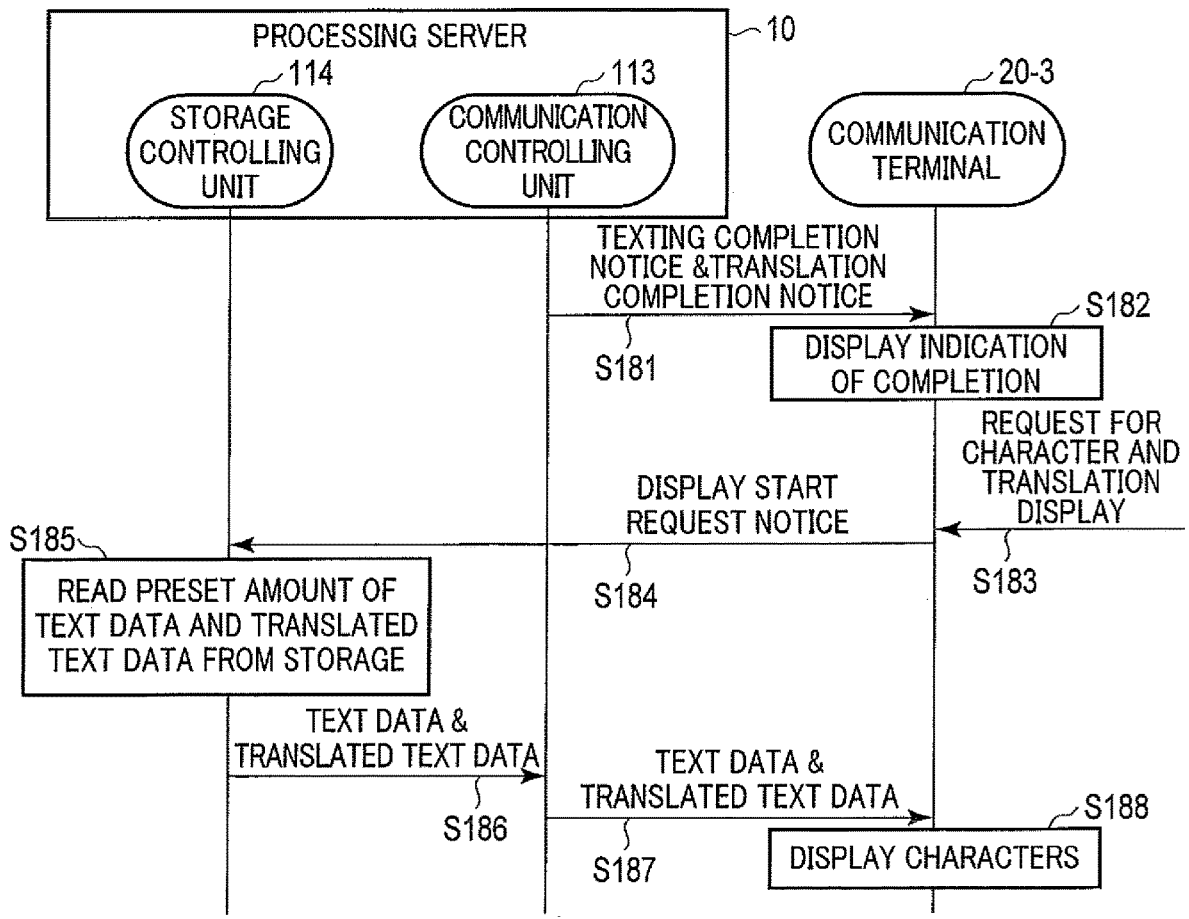
F I G. 18

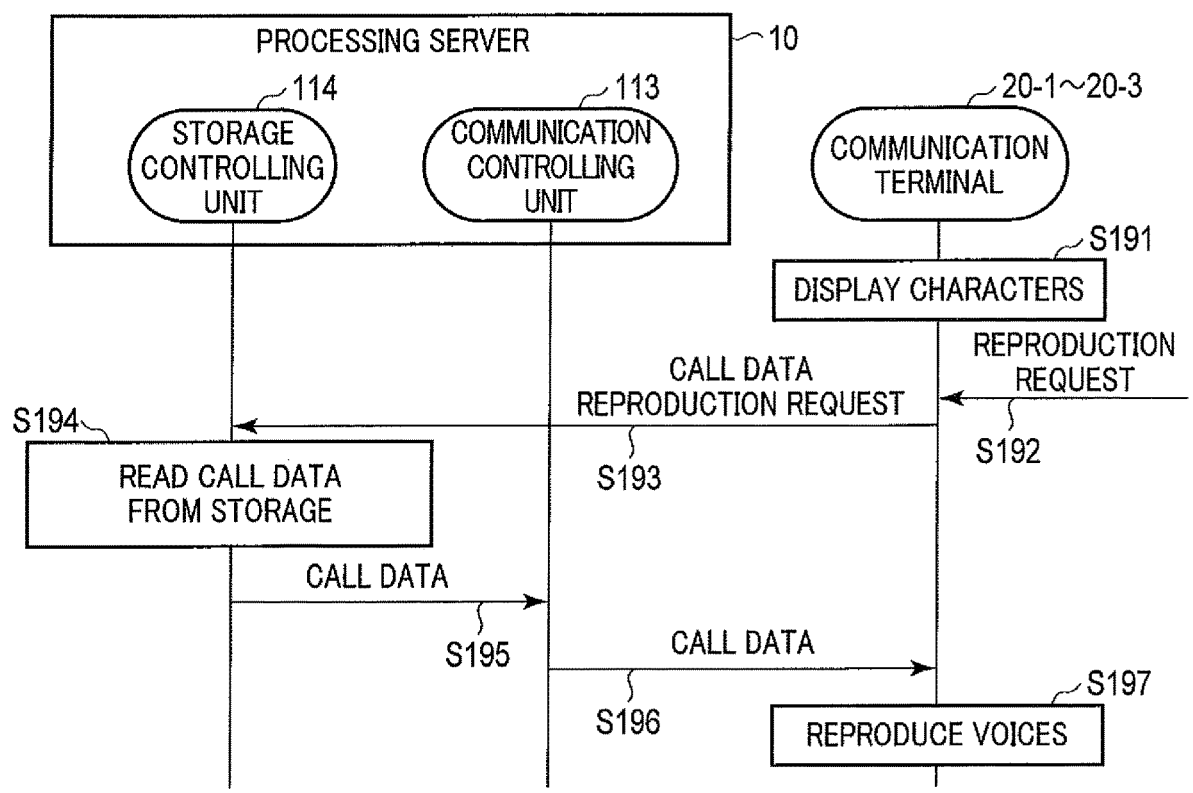
F I G. 19

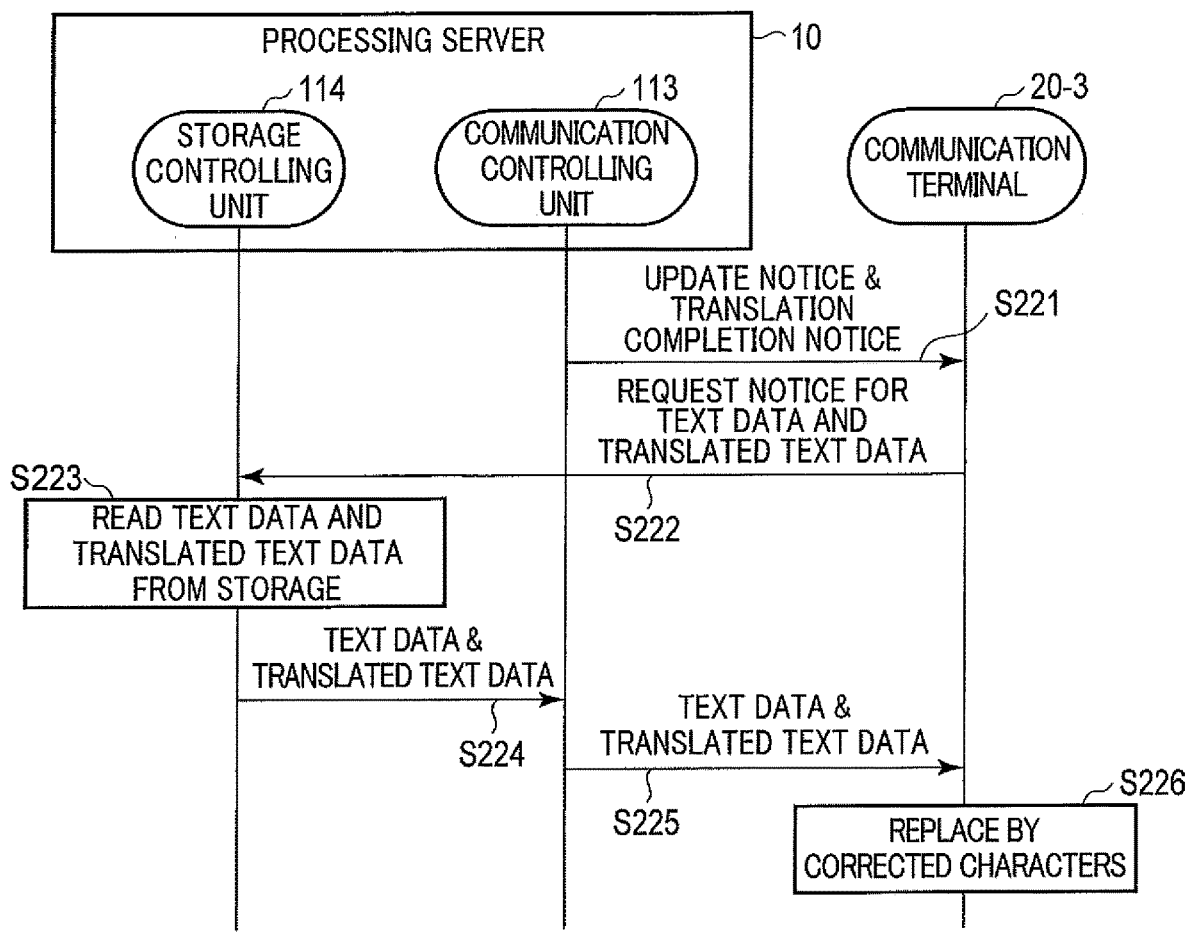
F I G. 22

SIGNAL PROCESSING APPARATUS, COMMUNICATION SYSTEM, METHOD PERFORMED BY SIGNAL PROCESSING APPARATUS, STORAGE MEDIUM FOR SIGNAL PROCESSING APPARATUS, METHOD PERFORMED BY COMMUNICATION TERMINAL, AND STORAGE MEDIUM FOR COMMUNICATION TERMINAL TO RECEIVE TEXT DATA FROM ANOTHER COMMUNICATION TERMINAL IN RESPONSE TO A UNIQUE TEXTING COMPLETION NOTICE

CROSS-REFERENCE TO RELATED APPLICATIONS

This application is a Divisional Application of U.S. Ser. No. 16/520,015 filed Jul. 23, 2019, which is a Continuation Application of PCT Application No. PCT/JP2018/021725, filed Jun. 6, 2018 and based upon and claims the benefit of priority from prior Japanese Patent Application No. 2017-119046, filed Jun. 16, 2017, the entire contents of which are incorporated herein by reference.

BACKGROUND OF THE INVENTION

Technical Field

The present invention relates to a signal processing apparatus, a communication system, a method performed by a signal processing apparatus, a program executed by a signal processing apparatus, a method performed by a communication terminal, and a program executed by a communication terminal.

Discussion

Push-to-Talk (PTT) communication, being a half-duplex voice communication system, is known as the technique realizing one-to-many simultaneous group voice communications. The PTT communication involves use of, for example, transceivers, wireless equipment, etc., as terminals. In the PTT communication, a user is permitted to send voices to other parties forming a group, during a period where the user is pressing a call button arranged on its terminal.

The recent spread of multipurpose communication terminals such as smartphones has attracted attention to Push-to-Talk over Cellular (PoC) that stipulates transmission of packets including voice data to multiple devices in a multicast manner. According to the PoC, a transmission right for transmitting voice data is given to one of multiple communication terminals forming a group. The communication terminal having acquired the transmission right transmits voice data to the other communication terminals in a multicast manner.

It is often the case with the communication systems realizing one-to-many simultaneous group voice communications that information is miscommunicated due to circumstances such as receivers not hearing intended contents of voice data correctly. There is therefore a demand in the communication systems of this type for the art that can suppress miscommunication of information.

SUMMARY

According to a first embodiment, a signal processing apparatus correlates a plurality of communication terminals as a group and enables one-to-many communications from one of the communication terminals in the group to remaining one or more of the communication terminals in the group. The signal processing apparatus includes processing circuitry. The processing circuitry assigns a transmission right to one of the communication terminals in the group. The transmission right is a right to transmit data. The processing circuitry generates text data based on voice data from said one of the communication terminals in possession of the transmission right. The processing circuitry gives a texting completion notice indicative of completion of texting processing to the communication terminals in the group. The processing circuitry transmits, after the texting completion notice is given, the generated text data to at least one of the communication terminals in the group.

According to a second embodiment, a communication system includes a plurality of communication terminals and a signal processing apparatus. The signal processing apparatus correlates the communication terminals as a group and enables one-to-many communications from one of the communication terminals in the group to remaining one or more of the communication terminals in the group. The signal processing apparatus includes processing circuitry. The processing circuitry assigns a transmission right to one of the communication terminals in the group. The transmission right is a right to transmit data. The processing circuitry generates text data based on voice data from said one of the communication terminals in possession of the transmission right. The processing circuitry gives a texting completion notice indicative of completion of texting processing to the communication terminals in the group. The processing circuitry transmits, after the texting completion notice is given, the generated text data to at least one of the communication terminals in the group.

According to a third embodiment, a communication method is performed by a signal processing apparatus. The signal processing apparatus correlates a plurality of communication terminals as a group and enables one-to-many communications from one of the communication terminals in the group to remaining one or more of the communication terminals in the group. The communication method includes a step for generating text data based on voice data from one of the communication terminals in the group, which is assigned with a transmission right. The transmission right is a right to transmit data. The communication method includes a step for sending, after generating the text data, a texting completion notice indicative of completion of texting processing to the communication terminals in the group. The communication method includes a step for transmitting, after sending the texting completion notice, the generated text data to at least one of the communication terminals in the group.

According to a fourth embodiment, a communication method is performed by each of a plurality of communication terminals which are correlated as a group for performing one-to-many communications from one of the communication terminals in the group to remaining one or more of the communication terminals in the group. The communication method includes a step for receiving a texting completion notice indicative of completion of texting processing on voice data having been transmitted from one of the communication terminals. The communication method includes a step for transmitting, in response to the received texting completion notice, a request signal for requesting transmission of text data generated by the texting processing. The communication method includes a step for receiving the text data returned in response to the request signal.

The communication method includes a step causing a display to display a character based on the received text data.

BRIEF DESCRIPTION OF THE DRAWINGS

FIG. 1 is a block diagram showing a functional configuration for a communication system according to a certain embodiment.

FIG. 2 is a block diagram showing a functional configuration for a processing server appearing in FIG. 1.

FIG. 4 is a diagram for explaining operations of the processing server and the communication terminals in the communication system of FIG. 1, for performing voice communications.

FIG. 5 is a diagram showing a management table stored in a storage appearing in FIG. 2.

FIG. 6 is a diagram showing a user management table stored in the storage appearing in FIG. 2.

FIG. 7 is a diagram showing a structure of voice data generated by a processor appearing in FIG. 3.

FIG. 15 is a diagram showing characters displayed by the communication terminal, after the processing as explained with reference to FIG. 14.

FIG. 16 is a diagram for explaining operations of the processing server and the communication terminals appearing in FIG. 1, for the communication terminals to cause their respective displays to display characters corresponding to voices.

FIG. 17 is a diagram showing a texting completion indication displayed by the communication terminals appearing in FIG. 1.

FIG. 18 is a diagram for explaining operations of the processing server and each communication terminal appearing in FIG. 1, for the communication terminal to cause its display to display characters corresponding to text data and translated text data.

FIG. 19 is a diagram for explaining operations of the processing server and the communication terminals appearing in FIG. 1, for the communication terminals to reproduce voices corresponding to characters displayed on their respective displays.

FIG. 22 is a diagram for explaining operations of the processing server and each communication terminal appearing in FIG. 1, for the communication terminal to cause its display to display characters after correction and translation.

DETAILED DESCRIPTION

Figure 3:
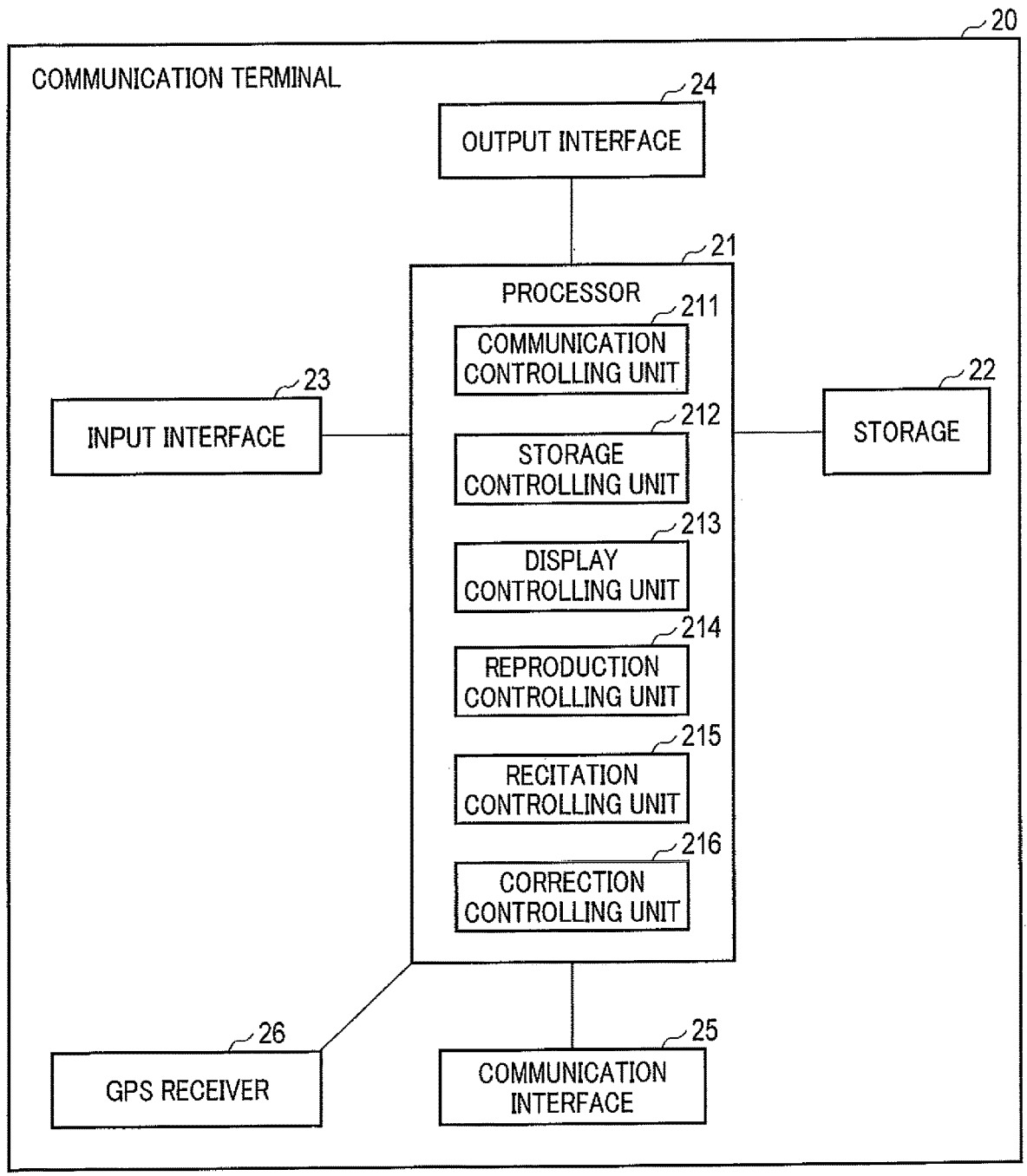
FIG. 3 is a block diagram showing a functional configuration for each communication terminal appearing in FIG. 1.

Now, embodiments will be described with reference to the drawings.

FIG. 1 is a block diagram showing an example of the functional configuration for a communication system 1 according to a certain embodiment. The communication system 1 of FIG. 1 utilizes, for example, Push-to-Talk over Cellular (PoC) to realize one-to-many voice communications in units of groups. For example, the communication system 1 includes, as shown in FIG. 1, a processing server 10, communication terminals 20-1 to 20-*m*, and base stations 30-1 to 30-*n*.

The processing server 10 is connected to the base stations 30-1 to 30-*n* via a network such as the Internet, a communication network furnished by a communication carrier, and so on. The communication terminals 20-1 to 20-*m* are each adapted for wireless connection to any of the base stations 30-1 to 30-*n* that forms a wireless area covering the terminal's current location.

The processing server 10 may be, for example, a signal processing apparatus adapted to implement control for transmitting, in a multicast manner, voice data from any of the communication terminals 20-1 to 20-*m* that possesses a transmission right, to other one or more of the communication terminals 20-1 to 20-*m* for users participating in the same talk group as the user of the originating terminal. The embodiments will assume the transmission right to mean a right by which voice data transmissions in the context of PoC are permitted.

FIG. 2 is a block diagram showing an example of the functional configuration for the processing server 10 appearing in FIG. 1. As shown in FIG. 2, the processing server 10 includes, for example, a processor 11, a storage 12, and a communication interface 13. The processor 11, the storage 12, and the communication interface 13 are connected together via, for example, a bus so that they can communicate with each other.

The processor 11 includes, for example, components such as a central processing unit (CPU), a first memory for use in the CPU's processing, and a second memory between the CPU and the first memory. The first memory is a so-called main storage device, and may be constituted by, for example, a dynamic random access memory (DRAM), The second memory is a so-called cache memory, and may be constituted by, for example, a static RAM (SRAM). The processor 11 may be, for example, processing circuitry.

In an exemplary operation, the CPU loads application programs stored in the storage 12 into the first memory and the second memory. The CPU runs the application programs loaded into the first memory and the second memory. The processor 11 thus realizes various functions corresponding to the application programs.

The storage 12 is a so-called auxiliary storage device, and may include a hard disk drive (HDD), nonvolatile storage circuitry, e.g., a solid state drive (SSD), etc., for storing various types of information. Note that the storage 12 may also be a drive device, etc., adapted to read and write various information sets from and to portable storage media such as a CD-ROM, a DVD, and a flash memory. The storage 12 stores application programs related to the embodiments.

The storage 12 is adapted to store user information for users participating in talk groups, under the control of the processor 11. The storage 12 is also adapted to store call data generated based on voice data transmitted from a communication terminal having the transmission right, under the control of the processor 11. The storage 12 is adapted to store text data obtained by subjecting the call data to texting processing, and also text data after correction by a communication terminal having the transmission right, under the control of the processor 11. The storage 12 is further adapted to store translated text data obtained by subjecting the text data to translation processing, under the control of the processor 11.

The communication interface 13 is circuitry for connection to the network. The communication interface 13 is adapted to transmit, via the network, data to at least one of the communication terminals 20-1 to 20-*m* each wirelessly connected to the corresponding station of the base stations 30-1 to 30-*n*. The communication interface 13 is also adapted to receive, via the network, data transmitted from at least one of the communication terminals 20-1 to 20-*m* each wirelessly connected to the corresponding station of the base stations 30-1 to 30-*n*.

The processor 11 shown in FIG. 2 runs the application programs stored in the storage 12 to realize functions corresponding to these programs. For example, by running the application programs, the processor 11 realizes functions to serve as a registration processing unit 111, a transmission right assigning unit 112, a communication controlling unit 113, a storage controlling unit 114, a texting processing unit 115, and a translation processing unit 116.

The processor 11 shown in FIG. 2 may be constituted by a combination of multiple CPUs. That is, the registration processing unit 111, the transmission right assigning unit 112, the communication controlling unit 113, the storage controlling unit 114, the texting processing unit 115, and the translation processing unit 116 shown in FIG. 2 may be realized by, for example, the respective CPUs running the corresponding application programs.

The processor 11 may also be constituted by special hardware components having the respective functions of the registration processing unit 111, the transmission right assigning unit 112, the communication controlling unit 113, the storage controlling unit 114, the texting processing unit 115, and the translation processing unit 116. Moreover, the processor 11 may be constituted by an application specific integrated circuit (ASIC), a field programmable gate array (FPGA), other complex programmable logic device (CPLD), or a simple programmable logic device (SPLD), which incorporates dedicated hardware circuits having the respective functions of the registration processing unit 111, the transmission right assigning unit 112, the communication controlling unit 113, the storage controlling unit 114, the texting processing unit 115, and the translation processing unit 116.

The registration processing unit 111 is adapted to register users participating in talk groups for conducting one-to-many voice communications. More specifically, and for example, the registration processing unit 111 acquires user information, i.e., information about users participating in a given talk group, based on a request from the communication terminals 20-1 to 20-*m*. The registration processing unit 111 stores the acquired user information in the storage 12 as well as in the first memory, in association with the talk group intended for participation.

The user information may include, for example, an ID of a talk group, an ID of a user participating in the talk group, an IP address of the user's communication terminal, a language code of language set by the user, a login state of the user, location information of the user's communication terminal, and so on. The registration processing unit 111 stores, in the storage 12, definition information indicative of which user participates in which talk group, that is, the ID of a talk group and the IDs of users participating in the talk group, for example. Also, the registration processing unit 111 stores, in the first memory, information which dynamically changes according to the corresponding communication terminals 20 and their states, that is, the IP addresses, the language codes, the login states, and the location information, etc., for example.

The transmission right assigning unit 112 is adapted to assign the transmission right to one of the communication terminals for users participating in a given talk group.

The communication controlling unit 113 is adapted to control communications among the communication terminals for users participating in talk groups, so that one-to-many voice communications are implemented. More specifically, in an exemplary instance, the communication controlling unit 113 transmits voice data transmitted from a communication terminal assigned with the transmission right, to the communication terminals held by users participating in the same talk group.

Also, the communication controlling unit 113 is adapted to control communications so that text data converted from voice data is transmitted to the communication terminals for users participating in a talk group. More specifically, in an exemplary instance, the communication controlling unit 113 transmits, upon conversion of voice data into text data, a notice indicative of the completion of the texting processing to the communication terminals held by users participating in a talk group. Then, in response to the communication terminals requesting transmission of the text data, the communication controlling unit 113 transmits the text data to the requestor communication terminals.

The communication controlling unit 113 is adapted to control communications so that translated text data, which is generated by translating text data into a given language, is transmitted to the communication terminals in need of the translation. More specifically, in an exemplary instance, the communication controlling unit 113 transmits, upon translation of text data, a notice indicative of the completion of the translation processing to the communication terminals held by users participating in a talk group. Then, in response to the communication terminals requesting transmission of the translated text data, the communication controlling unit 113 transmits the translated text data to the requestor communication terminals.

The communication controlling unit 113 is adapted to control communications so that, when text data is corrected by a communication terminal with the transmission right, the corrected text data is transmitted to the communication terminals for users participating in a talk group. More specifically, in an exemplary instance, the communication controlling unit 113 transmits, if a communication terminal with the transmission right corrects text data, a notice indicative of the update of display to the communication terminals held by users participating in the corresponding talk group. Then, in response to the communication terminals requesting transmission of the corrected text data, the communication controlling unit 113 transmits the corrected text data to the requestor communication terminals.

Furthermore, the communication controlling unit 113 is adapted to control communications so that call data is transmitted to communication terminals requesting reproduction of the call data. More specifically, and for example, in response to a request for reproduction of call data from users participating in a talk group, the communication controlling unit 113 transmits the call data stored in the storage 12 to the requestor communication terminals.

The storage controlling unit 114 is adapted to control processing for storing received voice data and various types of generated data. More specifically, and for example, the storage controlling unit 114 retains, in the cache memory, voice data transmitted from a communication terminal with the transmission right. Then, for example, the storage controlling unit 114 collects a predetermined volume of the voice data retained by the cache memory, and stores the collected data in the storage 12 as call data. The storage controlling unit 114 also stores, for example, text data obtained by the texting processing unit 115 and text data corrected by the communication terminal with the transmission right, in the storage 12. The storage controlling unit 114 stores, for example, translated text data generated by the translation processing unit 116 in the storage 12, as well. Furthermore, the storage controlling unit 114 may be adapted to read the call data, the text data, and the translated text data stored in the storage 12 upon request, and transmit them to the requestors.

The texting processing unit 115 is adapted to convert voice data transmitted from a communication terminal with the transmission right into text data. More specifically, and for example, the texting processing unit 115 converts a predetermined volume of the voice data retained in the cache memory into text data based on grammar information, linguistic structure information, information about compositions of voice data, stored word information, and so on. Note that the voice-to-text conversion processing adopted by the texting processing unit 115 may utilize the existing technology.

The translation processing unit 116 is adapted to perform translation processing on the text data obtained through the conversion processing by the texting processing unit 115, in order to generate translated text data. More specifically, and for example, the translation processing unit 116 translates the text data obtained through the conversion processing by the texting processing unit 115 into the text data in a language corresponding to the language code associated with the applicable user participating in a talk group. Note that the translation processing adopted by the translation processing unit 116 may utilize the existing technology, including the statistical machine translation, neural machine translation, etc.

Note that the processing server 10 may include an input interface. The input interface may be realized by, for example, a mouse, a keyboard, a touch pad which receives input instructions through contact of its operation screen, and so on. The input interface may convert input instructions from operators into electric signals, and output the electric signals to the processor 11. The input interface is not limited to physical operation devices such as a mouse, a keyboard, etc. Examples of the input interface may include a receive port adapted to accept electric signals from external input devices.

The processing server 10 may also include an output interface. The output interface may be realized by, for example, a display device, a print device, and the like. As the display device, any display equipment may be employed, including a CRT display, a liquid crystal display, an organic EL display, an LED display, a plasma display, etc. The display device is adapted to display image data for display subjects. The print device is, for example, a printer. The print device is adapted to print out image data for print subjects in the form of a predetermined sheet. The output interface is not limited to physical output devices such as a display device, a print device, etc. Examples of the output interface may include an output port adapted to send out image data to an external output devices.

The base stations 30-1 to 30-$n$ are provided for respective areas of a predetermined size, and each adapted to form a predetermined wireless area. The base stations 30-1 to 30-$n$ are each adapted to be wirelessly connected to one or more of the communication terminals 20-1 to 20-$m$, which are located within the wireless area formed by itself.

The communication terminals 20-1 to 20-$m$ may be terminals held by respective users, and each may be, for example, a cellular phone, a smartphone, a tablet PC, a given special terminal device, or the like. The communication terminals 20-1 to 20-$m$ are adapted to conduct one-to-many voice communications under the PoC via the processing server 10. In an exemplary instance, the communication terminals 20-1 to 20-$m$ each participate in a group talk according to a user operation. One of the communication terminals 20-1 to 20-$m$ acquires the transmission right, following a user operation. The communication terminal having acquired the transmission right accepts voice inputs from its user, and transmits the voice data based on the accepted voices to other communication terminals participating in the same group talk via the processing server 10. Also, the communication terminals 20-1 to 20-$m$ are adapted to receive text data generated at the processing server 10 based on the voices, and display the characters corresponding to the text data on their respective displays.

FIG. 3 is a block diagram showing an example of the functional configuration for each of the communication terminals 20 appearing in FIG. 1. The communication terminal 20 of FIG. 3 includes, for example, a processor 21, a storage 22, an input interface 23, an output interface 24, a communication interface 25, and a GPS receiver 26. Note that the communication terminals 20-1 to 20-$m$ share similar configurations, so they may each be construed as the communication terminal 20 in the description with reference to FIG. 3.

The processor 21 may include, for example, components such as a CPU, and a volatile memory, e.g., a random access memory (RAM), as a main storage device for use in the CPU's processing. In an exemplary operation, the CPU loads application programs stored in the storage 22 into the RAM. The CPU runs the application programs loaded into the RAM. The processor 21 thus realizes various functions corresponding to the application programs.

The storage 22 is a so-called auxiliary storage device, and may include nonvolatile storage circuitry, e.g., a NAND or NOR flash memory, etc. Note that the storage 22 may also be a drive device, etc., adapted to read and write various information sets from and to portable storage media such as an SD card, a micro SD card, and so on. The storage 22 stores application programs related to the embodiments. The storage 22 also stores information for the group talks available for its terminal to participate in.

The input interface 23 may be realized by buttons, a touch panel which receives input instructions through contact of its operation screen, a microphone for voice inputs, and so on. The input interface 23 is adapted to convert input instructions from an operator into electric signals, and output the electric signals to the processor 21.

The output interface 24 may be realized by, for example, a display device, a speaker, and so on. Examples of the display device include a liquid crystal display, an organic EL display, etc. The display device is adapted to display image data for display subjects. The speaker is adapted to reproduce voice data involved in voice communications.

The communication interface 25 is circuitry for wireless communications with the base stations 30-1 to 30-n. The communication interface 25 may be realized by, for example, an antenna and a wireless equipment component. The antenna is adapted to receive incoming radio signals. Also, the antenna is adapted to transmit radio signals output from the wireless equipment component. The wireless equipment component is adapted to convert the radio signals received by the antenna with a preset demodulation scheme, and output the data after the conversion to the processor 21. The wireless equipment component is also adapted to convert the data generated at the processor 21 into radio signals with a preset modulation scheme, and output the radio signals after the conversion to the antenna.

The GPS receiver 26 is adapted to receive signals from GPS satellites, and generate location information based on the received signals.

The processor 21 shown in FIG. 3 runs the application programs stored in the storage 22 to realize functions corresponding to these application programs. For example, by running the application programs, the processor 21 realizes functions to serve as a communication controlling unit 211, a storage controlling unit 212, a display controlling unit 213, a reproduction controlling unit 214, a recitation controlling unit 215, and a correction controlling unit 216.

The communication controlling unit 211 is adapted to control the communications with the processing server 10. More specifically, and for example, the communication controlling unit 211 of the communication terminal 20 with the transmission right converts a voice input from the microphone by following a TCP/IP-based unique protocol. The communication controlling unit 211 transmits the voice data after the conversion to the processing server 10 via the network and the corresponding base station 30. Also, the communication controlling unit 211 of the communication terminal 20 with the transmission right receives text data from the processing server 10 via the network and the corresponding base station 30.

For the communication terminals 20 without the transmission right, for example, the communication controlling unit 211 of each of these terminals receives voice data, and text data converted from the voice data through the texting processing, from the processing server 10. Also, if the language which is set for the respective communication terminal 20 without the transmission right differs from the language which is set for the communication terminal 20 with the transmission right, the communication controlling unit 211 of the former receives proper translated text data, i.e., the text data translated into the language set for the own terminal, from the processing server 10.

The storage controlling unit 212 is adapted to control processing for storing a variety of received notices, text data, and translated text data. More specifically, and for example, the storage controlling unit 212 causes the volatile memory (e.g., RAM) to store a variety of notices, text data, and translated text data upon receipt of these. The various notices, text data, and translated text data stored in the volatile memory may be deleted from the volatile memory when the execution of the application program for performing one-to-many voice communications has come to an end, when the communication terminal 20 is powered off, or on any suitable conditions. This can obviate the risk of information leakage, etc.

The display controlling unit 213 is adapted to control processing for display operations with the display as the output interface 24. More specifically, and for example, the display controlling unit 213 controls the display so that the display presents characters based on the received various notices, as well as the received text data and translated text data.

The reproduction controlling unit 214 is adapted to control reproduction of voices corresponding to the characters which are based on text data and being displayed on the display. More specifically, and for example, the reproduction controlling unit 214 controls the speaker as the output interface 24 to reproduce the call data corresponding to the characters which are based on text data and currently displayed on the display.

The recitation controlling unit 215 is adapted to control recitation of characters which are based on translated text data and being displayed on the display. More specifically, and for example, in response to a request for recitation of characters which are based on translated text data and currently displayed on the display, the recitation controlling unit 215 converts the characters as a subject of the request into voice data. The recitation controlling unit 215 then controls the speaker as the output interface 24 to reproduce the voice data obtained from the conversion. Note that the recitation controlling unit 215 may be realized by an application program interface (API) provided by an operating system (OS).

The correction controlling unit 216 is adapted to control processing for correcting characters displayed on the display. More specifically, and for example, in response to a request for correction of characters currently displayed on the display, the correction controlling unit 216 corrects the displayed characters and also transmits the corrected text data to the processing server 10.

Next, description will be given of how the processing server 10 and the communication terminals 20-1 to 20-m, configured as above and constituting the communication system 1, would operate. Note that the description will assume an instance where the communication terminals 20-1 to 20-3 will participate in a talk group G1 for implementing voice communications.

FIG. 4 is a diagram for explaining exemplary operations of the processing server 10 and the communication terminals 20-1 to 20-3 for performing voice communications in the communication system 1 of FIG. 1. The explanation based on FIG. 4 assumes that, in each of the communication terminals 20-1 to 20-3, the storage 22 already stores the information for the talk group G1. That is, the communication terminals 20-1 to 20-3 are in the state ready to participate in the talk group G1.

First, the users of the respective communication terminals 20-1 to 20-3 operate the communication terminals 20-1 to 20-3 to each launch the application program for conducting one-to-many voice communications utilizing the PoC (step S41). In each of the communication terminals 20-1 to 20-3, the display controlling unit 213 causes the display as the output interface 24 to present a display indicative of, for example, the talk group G1 as a selectable talk group (step S42). The display here may show two or more talk groups open for participation.

The users of the communication terminals 20-1 to 20-3 select the talk group G1 shown on their own displays. The processor 21 of each of the communication terminals 20-1 to 20-3 may automatically select the talk group G1 for participation, according to the frequency of participation, user setting, etc. Upon selection of the talk group G1, the display controlling unit 213 of each of the communication terminals 20-1 to 20-3 causes the display to display a list of languages available in the service. The users of the communication terminals 20-1 to 20-3 each select the language desired for use, from the multiple languages shown on the own display (step S43). Also, upon selection of the talk group G1, the processor 21 of each of the communication terminals 20-1 to 20-3 causes the own GPS receiver 26 to generate location information as of the talk group selection.

Upon selection of the talk group and the language for use, the communication controlling unit 211 of each of the communication terminals 20-1 to 20-3 generates information data containing an ID of the selected talk group (hereinafter, "talk group ID"), an ID set for the own terminal (hereinafter, "user ID"), information for the selected language (hereinafter, "language code"), the obtained location information, etc. The information data has, for example, a packet structure. The communication terminals 20-1 and 20-2 transmit the generated information data to the processing server 10 via the base station 30-1 and the network NW (step S44). Meanwhile, the communication terminal 20-3 transmits the generated information data to the processing server 10 via the base station 30-2 and the network NW (step S44).

The registration processing unit 111 of the processing server 10 stores, based on the information data transmitted from the communication terminals 20-1 to 20-3, information about the users as the talk group participants in the storage 12 as well as in the first memory in the processor 11, in association with the talk group intended for participation (step S45). More specifically, and for example, the registration processing unit 111 referring to the received information data updates a management table which is stored in the storage 12 and used for managing users participating in talk groups. FIG. 5 is a diagram showing an example of the management table stored in the storage 12 in FIG. 2. With the management table shown in FIG. 5, three talk groups are managed. As seen from this example, the stored information indicates that the users of the communication terminals 20-1 to 20-3 identified by the user IDs "User01" to "User03" are participating in the talk group G1 identified by the talk group ID "Group01".

The registration processing unit 111 also stores, based on the information data transmitted from the communication terminals 20-1 to 20-3, the information about the users as the talk group participants in the first memory in the processor 11. More specifically, and for example, the registration processing unit 111 referring to the received information data updates a user management table which is stored in the first memory and used for managing dynamically-changing user information. FIG. 6 is a diagram showing an example of the user management table stored in the first memory in the processor 11 in FIG. 2. The user management table shown in FIG. 6 manages information about users participating in talk groups. As seen from this example, the "User01" is associated with the "IP Address 01" of the communication terminal 20-1, as well as the "Language Code 01" indicative of, for example, Japanese language, and the "Location Information 01". Also, the "User02" is associated with the "IP Address 02" of the communication terminal 20-2, as well as the "Language Code 01" and the "Location Information 02". Further, the "User03" is associated with the "IP Address 03" of the communication terminal 20-3, as well as the "Language Code 02" indicative of, for example, English language, and the "Location Information 03".

It is not a requisite for the processing server 10 to acquire the location information of the communication terminals 20-1 to 20-3. Accordingly, it is not a requisite for the communication terminals 20-1 to 20-3 to generate their location information. The information data transmitted from the communication terminals 20-1 to 20-3 to the processing server 10 may omit inclusion of the location information.

Upon selection of the talk group and the language for use, the display controlling unit 213 of each of the communication terminals 20-1 to 20-3 causes the display to display a PTT call start requesting button (step S46). In this instance, for example, the user of the communication terminal 20-1 presses the PTT call start requesting button displayed on the display of the communication terminal 20-1 (step S47). Upon the user's pressing the PTT call start requesting button, the communication controlling unit 211 of the communication terminal 20-1 transmits a transmission right acquisition request notice as a request for the transmission right, together with the user ID to the processing server 10 via the base station 30-1 and the network NW (step S48). Note that the PTT call start requesting button is not limited to an object displayed on the display. For example, the PTT call start requesting button may be a physical button furnished on an operational device adapted for connection with the communication terminals, e.g., the communication terminal 20-1, via the respective input interface 23 as a connector.

The transmission right assigning unit 112 of the processing server 10, upon receipt of the transmission right acquisition request notice from the communication terminal 20-1, assigns the transmission right to the communication terminal 20-1 (step S49). Upon acquisition of the transmission right, the user of the communication terminal 20-1 inputs voices from the microphone of the communication terminal 20-1 (step S410). The communication controlling unit 211 of the communication terminal 20-1 generates voice data based on the voices input from the microphone (step S411). The voice data has, for example, a packet structure that conforms to the TCP/IP-based unique protocol.

FIG. 7 is a schematic diagram showing an example of the structure of the voice data generated by the processor 21 appearing in FIG. 3. The voice data of FIG. 7 includes an area for storing a talk group ID, an area for storing a caller ID, an area for storing a time stamp, an area for storing a data length, and an area for storing main data. The communication controlling unit 211 of the communication terminal 20-1 stores the "Group01" in the area for storing a talk group ID, the "User01" in the area for storing a caller ID, a call start time in the area for storing a time stamp, digital data of as much as predetermined frames of voices in the area for storing main data, and the data length of the digital data of voices in the area for storing a data length. The call start time indicates the time at which the call began. More concretely, the communication controlling unit 211 sets, for example, the time at which the user pressed the PTT call start requesting button, as the call start time.

The communication terminal 20-1 transmits the generated voice data to the processing server 10 via the base station 30-1 and the network NW (step S412).

Upon receipt of the voice data from the communication terminal 20-1 with the transmission right, the communication controlling unit 113 of the processing server 10 performs control for transferring the voice data to the communication terminals 20-2 and 20-3 participating in the talk group G1 (step S413). More specifically, and for example, upon receipt of the voice data from the communication terminal 20-1, the communication controlling unit 113 determines whether or not the caller ID "User01" stored in the voice data and the user ID "User01" of the user having been assigned with the transmission right agree with each other. As the caller ID stored in the voice data and the user ID of the user assigned with the transmission right are in agreement with each other, i.e., both being "User01", the communication controlling unit 113 generates duplicates of the voice data as many as the number of the users participating in the talk group G1. The communication controlling unit 113 transmits the duplicates of the voice data to the respective communication terminals 20-2 and 20-3 by referring to their IP addresses (step S414).

Upon receipt of the voice data from the processing server 10, the communication controlling unit 211 of each of the communication terminals 20-2 and 20-3 reproduces voices based on the received voice data by outputting them from the speaker (step S415). PTT call, i.e., a PoC communication, is therefore established.

Figure 8:
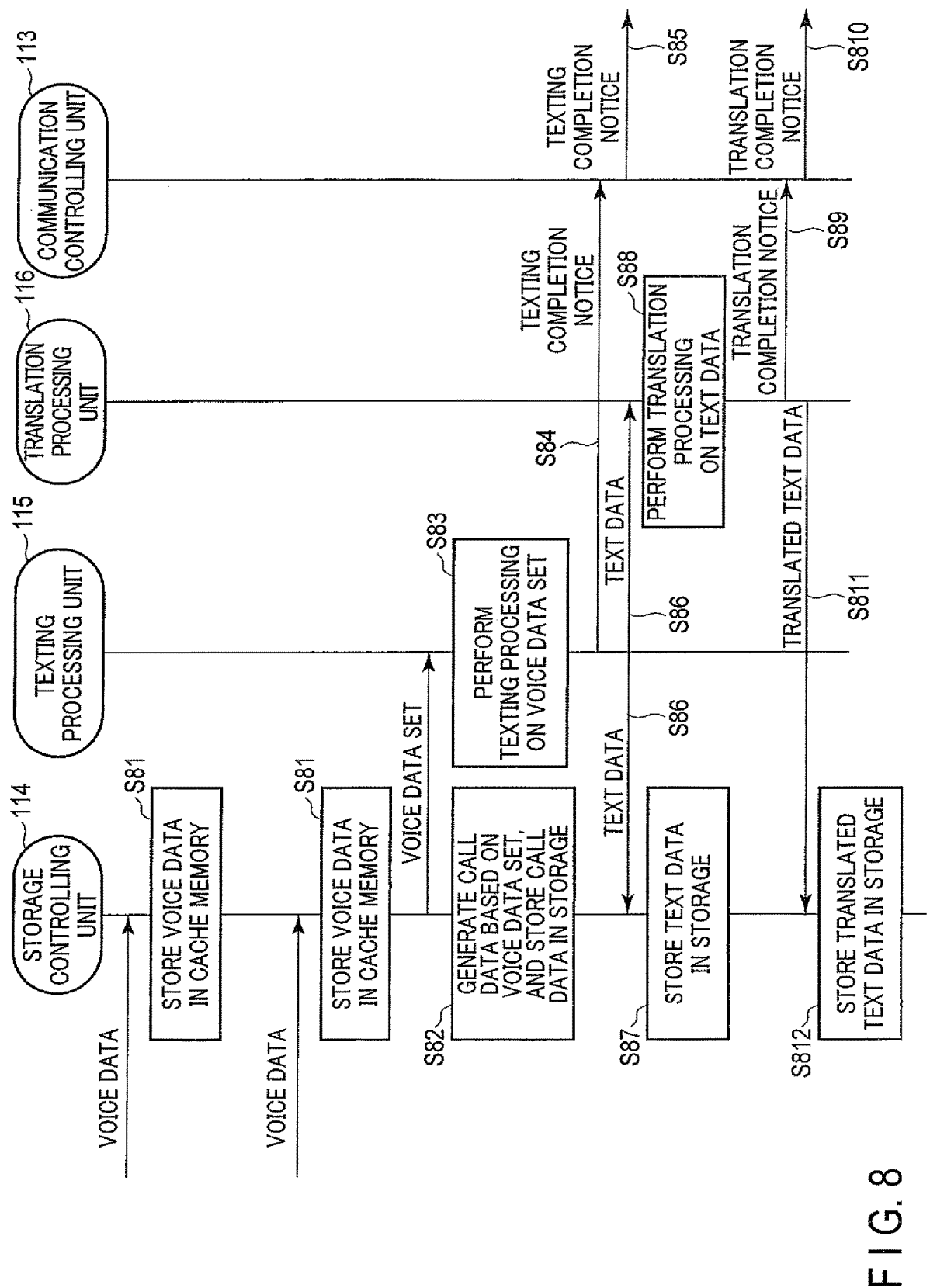
FIG. 8 is a diagram for explaining operations of the processing server appearing in FIG. 1, for generating text data and translated text data.

FIG. 8 is a diagram for explaining exemplary operations of the processing server 10 appearing in FIG. 1, for generating text data and translated text data.

Upon receipt of the voice data from the communication terminal 20-1, the processing server 10 performs the communication control as explained with reference to step S413 in FIG. 4 and also the processing shown in FIG. 8. More specifically, upon receipt of the voice data from the communication terminal 20-1, the storage controlling unit 114 of the processing server 10 stores the received voice data in the cache memory (step S81). The storage controlling unit 114 sequentially stores the voice data transmitted from the communication terminal 20-1 in the cache memory.

In response to the voice data in the cache memory reaching a predetermined volume, or in response to the end of a call before the voice data reaching the predetermined volume, the storage controlling unit 114 generates call data based on the multiple items of the voice data retained in the cache memory (step S82). In the embodiment, the predetermined volume may be, for example, a data amount corresponding to a sound sequence of about a 20-second length.

Figure 9:
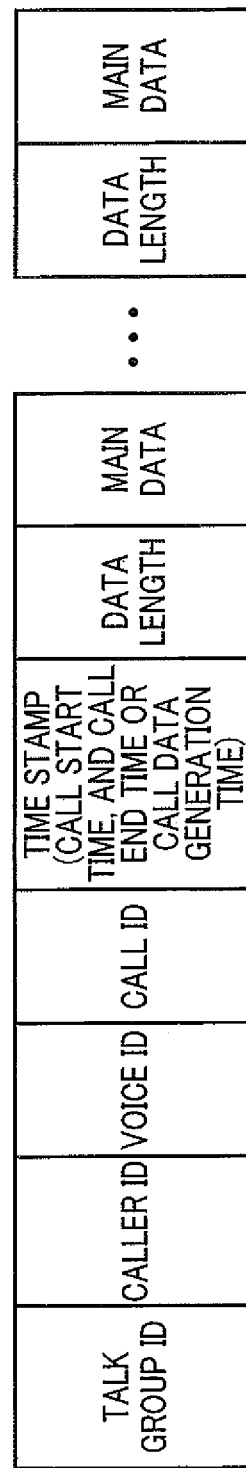
FIG. 9 is a schematic diagram showing a structure of call data generated by a storage controlling unit appearing in FIG. 2.

FIG. 9 is a schematic diagram showing an example of the structure of the call data generated by the storage controlling unit 114 appearing in FIG. 2. The call data of FIG. 9 includes an area for storing a talk group ID, an area for storing a caller ID, an area for storing a voice ID, an area for storing a call ID, an area for storing a time stamp, an area for storing a data length, and an area for storing main data. The voice ID is a unique ID for the identification of a call initiated by a caller. The call ID is a unique ID which is used when a call initiated by a caller ranges over more than one call data, in order to identify a position of the corresponding call data item within the series of multiple call data items constituting one call. As the call IDs, for example, 0, 1, 2, . . . , and so on are set for the respective call data items in chronological order. The time stamp here contains a call start time and a call end time. The call end time indicates the time at which the call initiated by a caller has ended. If a call initiated by a caller ranges over more than one call data, the time stamp will contain, instead of the call end time, a call data generation time. The call data generation time may indicate the time at which the call is sectioned, for example, the time at which the corresponding call data item is generated based on multiple voice data items.

More specifically, and for example, the storage controlling unit 114 sets the voice ID "Talk01" when the volume of voice data items retained in the cache memory, each having the talk group ID "Group01" and the caller ID "User01", reaches a predetermined volume. The storage controlling unit 114 also sets the call ID "0" indicative of the first call data related to the "Talk01". As to the time stamp, the storage controlling unit 114 sets "TimeS1" based on the time stamp contained in the voice data and indicating the call start time. Also as to the time stamp, the storage controlling unit 114 sets "TimeE1" based on the time at which the call data is generated. The storage controlling unit 114 generates the call data by placing the corresponding data members into the applicable areas. That is, the storage controlling unit 114 arranges the "Group01", "User01", "Talk01", "0", "TimeS1", "TimeE1", and the data length information and main data of the predetermined volume of the multiple voice data items retained in the cache memory, in the respective areas corresponding to these data members so that the call data is generated. The storage controlling unit 114 stores the generated call data in the storage 12.

In the event that the transmission right is released before the volume of the voice data in the cache memory, having the talk group ID "Group01" and the caller ID "User01", reaches the predetermined volume, the storage controlling unit 114 also sets the voice ID, the call ID, and the time stamp. The release of the transmission right may be realized by, for example, the user of the communication terminal 20-1, currently with the transmission right, removing its finger from the PTT call start requesting button. For example, in response to the user separating the finger from the PTT call start requesting button, the communication terminal 20-1 transmits a transmission right release request notice to the processing server 10. The transmission right assigning unit 112 of the processing server 10, upon receipt of the transmission right release request notice, releases the transmission right from the communication terminal 20-1. Note that the actions for acquiring and releasing the transmission right are not limited to pressing and separating from the PTT call start requesting button.

When the transmission right release request notice is received, the storage controlling unit 114 of the processing server 10 sets, for example, the time of receipt of the transmission right release request notice as the call end time. The storage controlling unit 114 sets the time stamp "TimeE1" based on the set call end time. The storage controlling unit 114 reads multiple voice data items each having the talk group ID "Group01" and the caller ID "User01" from the cache memory. The storage controlling unit 114 generates the call data by placing the data members into the areas for storing a talk group ID, a caller ID, a voice ID, a call ID, and a time stamp, respectively, and also by arranging the data length information and the main data of the read voice data items into the respective predetermined areas. The storage controlling unit 114 stores the generated call data in the storage 12. The call data is stored together with the time stamp containing the call start time and the call end time, etc., and therefore, the users will be able to use time information, such as the call start time and the call end time, as a search key for the retrieval of the call data.

In response to the voice data in the cache memory reaching the predetermined volume, or in response to the end of the call before the voice data reaching the predetermined volume, the texting processing unit 115 of the processing server 10 generates text data based on the multiple voice data items retained in the cache memory (step S83).

Figure 10:
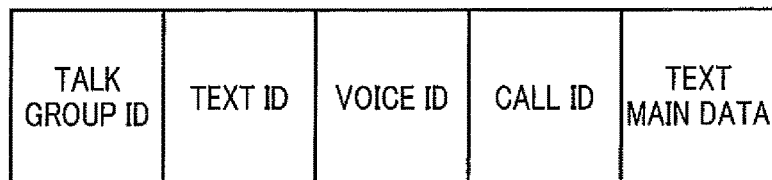
FIG. 10 is a diagram showing a structure of text data generated by a texting processing unit appearing in FIG. 2.

FIG. 10 is a schematic diagram showing an example of the structure of the text data generated by the texting processing unit 115 appearing in FIG. 2. The text data of FIG. 10 includes an area for storing a talk group ID, an area for storing a text ID, an area for storing a voice ID, an area for storing a call ID, and an area for storing text main data. The voice ID here adopts the same ID as in the call data subjected to the texting processing. The call ID adopts the same ID as in the call data subjected to the texting processing.

More specifically, and for example, when the volume of the voice data items retained in the cache memory, each having the talk group ID "Group01" and the caller ID "User01", reaches a predetermined volume, the texting processing unit 115 reads these voice data items. The texting processing unit 115 converts the main data portions contained in the read voice data items into text main data based on the grammar information, linguistic structure information, information about voice data compositions, stored word information, etc., about the "Language Code 01", i.e., Japanese language, having been associated with the "User01" as in FIG. 6. Upon converting the main data into the text main data, the texting processing unit 115 sets the text ID "Text01". The texting processing unit 115 generates the text data by placing the corresponding data members into the applicable areas. That is, the texting processing unit 115 arranges the "Group01", "Text01", "Talk01", the text main data, etc., in the respective areas corresponding to these data members, so that the text data is generated.

Also, in the event that the transmission right is released before the volume of the voice data in the cache memory, having the talk group ID "Group01" and the caller ID "User01", reaches the predetermined volume, the texting processing unit 115 reads the multiple voice data items each having the talk group ID "Group01" and the caller ID "User01" from the cache memory. The texting processing unit 115 generates the text data based on the main data contained in the read voice data.

Upon generation of the text data, the texting processing unit 115 notifies the communication controlling unit 113 of the completion of the texting processing (step S84). This notice of completing the texting processing includes, for example, the text ID of the generated text data. Upon receipt of the notice of completing the texting processing of the set of voice data items, the communication controlling unit 113 transmits a notice indicative of the completion of the texting processing to the communication terminals 20-1 to 20-3 participating in the talk group G1, via the network NW and the base station 30-1 (step S85). Note that the communication controlling unit 113 may transmit the notice indicative of the completion of the texting processing together with the later-described notice indicative of the completion of the translation processing, to the communication terminal 20-3 held by the "User03" for which the language code different from that for the "User01" is set. Also, the communication controlling unit 113 may omit the transmission of the notice indicative of the completion of the texting processing to this communication terminal 20-3.

The explanation with reference to the exemplary operations shown in FIG. 8 assumes an instance where the texting completion notice is transmitted to the communication terminals 20-1 to 20-3 participating in the talk group G1. However, this is not a limitation. The texting completion notice may also be transmitted to communication terminals which are not currently participating in the talk group G1 but which are eligible to participate in the talk group G1. Here, for example, the storage 12 of the processing server 10 stores, for each talk group, a list of users eligible as talk group participants. The communication controlling unit 113 of the processing server 10, referring to the list stored in the storage 12, transmits the texting completion notice to the users who can participate in the talk group G1.

Moreover, the texting completion notice may be transmitted to one or more communication terminals satisfying a predetermined condition, among the communication terminals eligible to participate in the talk group G1. The predetermined condition may include, for example, that the communication terminal is located within a certain distance from the communication terminal possessing the transmission right in light each communication terminal's location information stored in the storage 12, that the communication terminal is labeled a given flag, and so on.

The generated text data is output to the storage controlling unit 114 and the translation processing unit 116 (step S86). The storage controlling unit 114 stores the text data generated by the texting processing unit 115 in the storage 12 (step S87).

The translation processing unit 116 generates translated text data by performing translation processing on the text data generated by the texting processing unit 115 (step S88).

Figure 11:
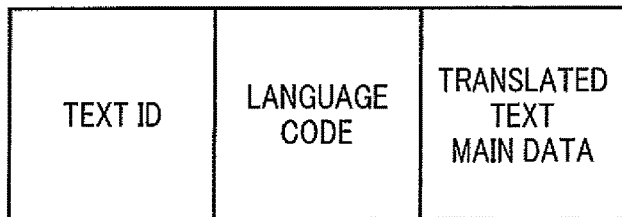
FIG. 11 is a diagram showing a structure of translated text data generated by a translation processing unit appearing in FIG. 2.

FIG. 11 is a schematic diagram showing an example of the structure of the translated text data generated by the translation processing unit 116 appearing in FIG. 2. The translated text data of FIG. 11 includes an area for storing a text ID, an area for storing a language code, and an area for storing translated text main data. The language code indicates the language corresponding to the translated text main data. As the text ID here, the original, pre-translated text data and the translated text data adopt the same ID.

More specifically, and for example, the translation processing unit 116 extracts the text main data from the text data generated by the texting processing unit 115. The translation processing unit 116 translates the extracted text main data into the corresponding language, for every language code different from the language code associated with the "User01"—in the case of the example of FIG. 6, into the text main data in the language corresponding to "Language Code 02", i.e., English—. The translation processing unit 116 generates the translated text data by placing the corresponding data members into the applicable areas. That is, the translation processing unit 116 arranges the "Text01", "Language Code 02", and the translated text main data in the respective areas corresponding to these data members, so that the translated text data is generated.

Upon generation of the translated text data, the translation processing unit 116 notifies the communication controlling unit 113 of the completion of the translation processing (step S89). This notice of completing the translation processing includes, for example, the text ID and the language code of the generated translated text data. Upon receipt of the notice of completing the translation processing, the communication controlling unit 113 transmits a notice indicative of the completion of the translation processing to the communication terminal 20-3 held by the "User03", for which the language code different from that for the "User01" is set, via the network NW and the base station 30-3 (step S810). Note that if, in step S85, the texting completion notice has not been transmitted to the communication terminal 20-3, the texting completion notice may be transmitted together with the translation completion notice to the communication terminal 20-3. The generated translated text data is output to the storage controlling unit 114 (step S811). The storage controlling unit 114 stores the translated text data generated by the translation processing unit 116 in the storage 12 (step S812). The processing from step S81 to step S812 is repeated until the call comes to an end.

The exemplary operations shown in FIG. 8 have been explained, assuming that the texting completion notice is a notice that is transmitted to the communication terminals every time the texting processing is completed. This is not a limitation. For communication terminals which are not currently participating in the talk group but which are eligible to participate in the talk group, it is also possible to transmit the texting completion notice only once after the termination of a call. The users are thereby allowed to recognize that there is the text data corresponding to the call.

Next, description will be given of how the text data and the translated text data are displayed on the communication terminals 20-1 to 20-3. In the context of a certain embodiment, display modes in the communication terminals 20-1 to 20-3 include, for example, a first display mode and a second display mode. In the first display mode, the PTT call start requesting button is displayed together with delivered voices and their corresponding characters. In the second display mode, the PTT call start requesting button is displayed, while voices and the corresponding characters are not displayed. Whether to adopt the first display mode or the second display mode depends on the user setting. The first display mode will be described first, and then the second display mode will be described.

Figure 12:
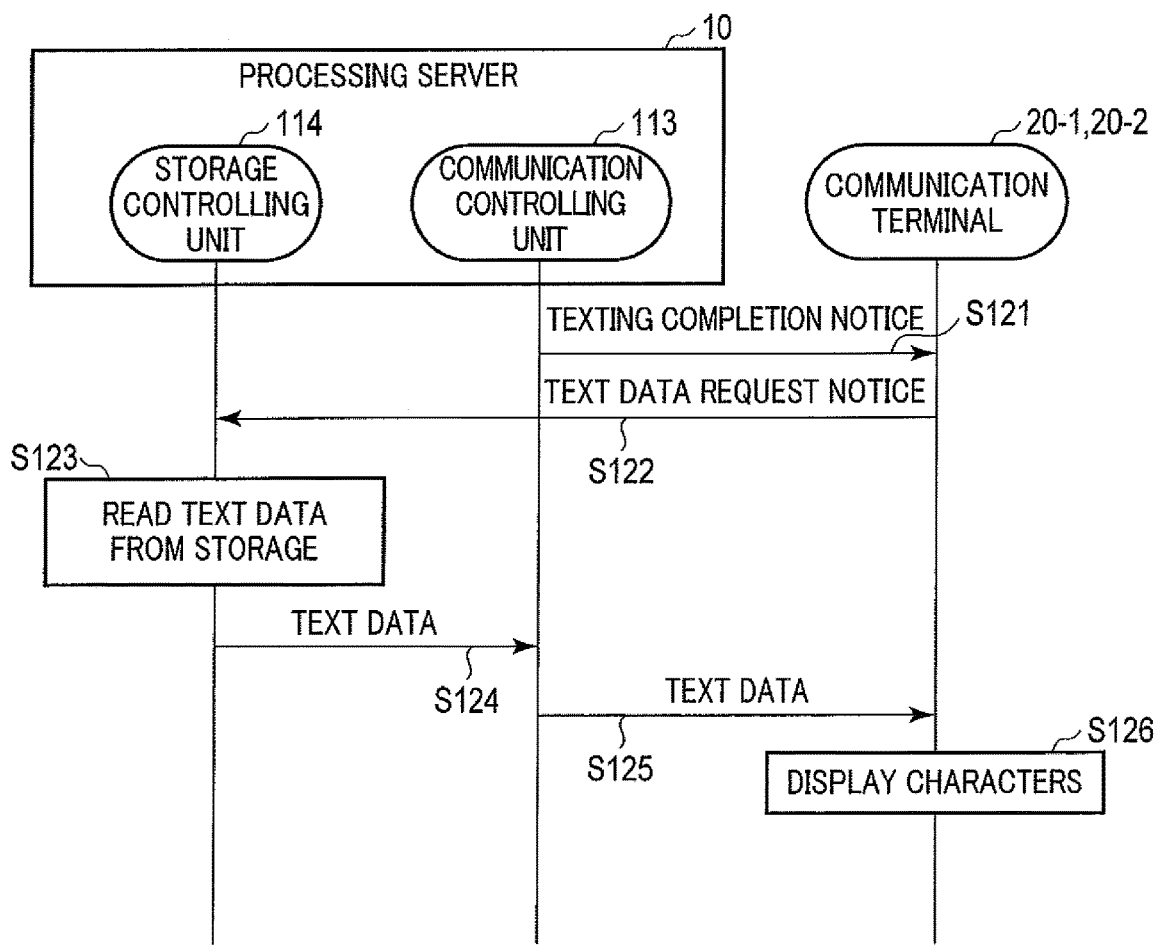
FIG. 12 is a diagram for explaining operations of the processing server and the communication terminals appearing in FIG. 1, for the communication terminals to cause their respective displays to display characters corresponding to voices.

FIG. 12 is a diagram for explaining exemplary operations of the processing server 10 and the communication terminals 20-1 and 20-2 appearing in FIG. 1, for the communication terminals 20-1 and 20-2 to cause their respective displays to display the characters corresponding to voices. The explanation with reference to FIG. 12 will assume an instance where the first display mode is set.

The communication terminal 20-1 with the transmission right, and the communication terminal 20-2 for which the same language code as that for the communication terminal 20-1 is set, receive a texting completion notice from the processing server 10 (step S121). The texting completion notice here contains the text ID of the text data after completion of the texting processing. The explanation with reference to FIG. 12 follows the explanation with reference to FIG. 8, so that it will be supposed that the texting completion notice contains the text ID "Text01".

In response to receiving the texting completion notice, the communication controlling unit 211 of the communication terminal 20-1 transmits a text data request notice indicative of a request for the text data containing the text ID "Text01" to the processing server 10 via the base station 30-1 and the network NW (step S122). The text data request notice here is labeled the user ID "User01" of the communication terminal 20-1 as the requestor. The communication controlling unit 211 of the communication terminal 20-2 also transmits a text data request notice indicative of a request for the text data containing the text ID "Text01", together with the user ID "User02" of the communication terminal 20-2, to the processing server 10 (step S122).

Upon receipt of the text data request notices, the storage controlling unit 114 of the processing server 10 reads the text data containing the text ID "Text01" from the storage 12 (step S123). The communication controlling unit 113 of the processing server 10 converts the text data read from the storage 12 into packet-form data (step S124). The communication controlling unit 113 generates duplicates of the data obtained through the packet-form conversion, as many as the number of the user IDs appended to the text data request notices. The communication controlling unit 113 transmits the duplicates of the data to the respective IP addresses specified based on the user IDs (step S125). In this manner, the text data after the conversion into a packet form is transmitted to the communication terminals 20-1 and 20-2.

In response to receiving the text data from the processing server 10, the storage controlling unit 212 of each of the communication terminals 20-1 and 20-2 stores the received text data in the own RAM. The display controlling unit 213 of each of the communication terminals 20-1 and 20-2 reads the text main data of the text data stored in the RAM. The display controlling unit 213 displays characters based on the read text main data as the characters corresponding to the voice ID "Talk01", on the display screen for the talk group G1 identified by the talk group ID "Group01" (step S126).

At this time, the display controlling unit 213 of the communication terminal 20-1 recognizes, based on the voice ID "Talk01", that the instant call is the call initiated by the own terminal. The display controlling unit 213 accordingly causes the display to display the characters in the form that can understandably shows that the corresponding call has been initiated by the own terminal. Any technique may be discretionarily adopted for providing the form of showing that a call concerned is its own call; for example, the characters may be displayed at different positions, in different colors, in different fonts, and so on.

Figure 13:
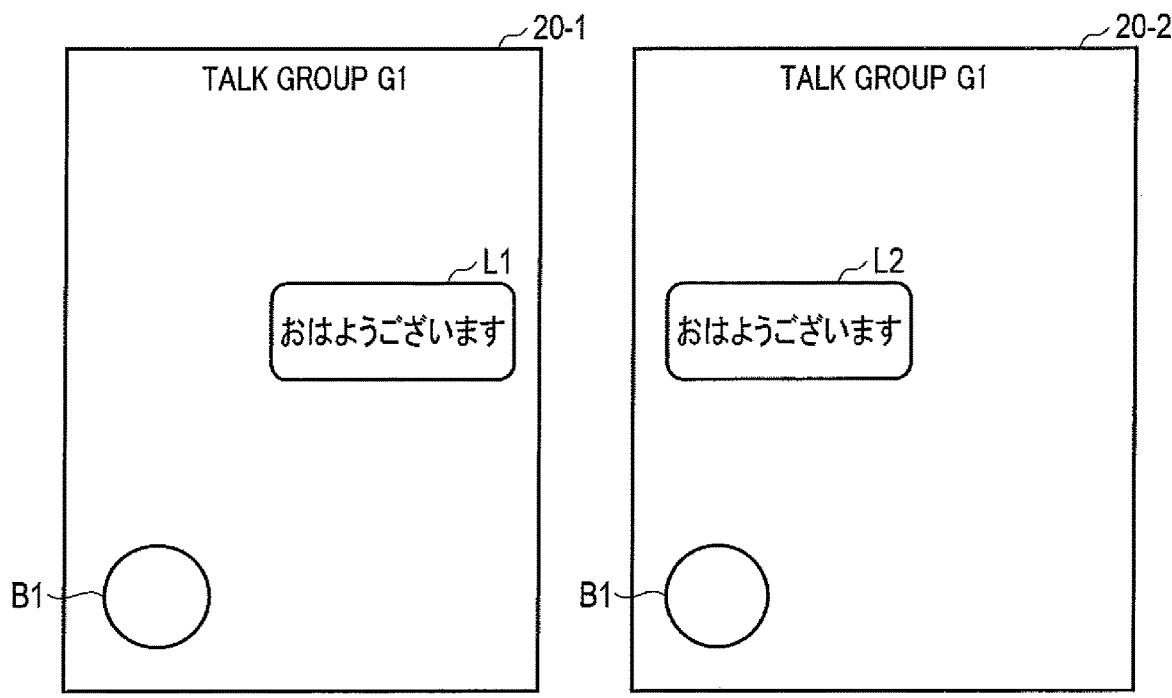
FIG. 13 is a diagram showing characters displayed after the processing as explained with reference to FIG. 12.

FIG. 13 includes schematic diagrams showing examples of how the characters are displayed after the processing as explained with reference to FIG. 12. The left part of FIG. 13 is a schematic diagram as an example of the display that may be presented on the display of the communication terminal 20-1 with the transmission right. The right part of FIG. 13 is a schematic diagram as an example of the display that may be presented on the display of the communication terminal 20-2 as a receiver terminal. As seen from FIG. 13, characters L1 for the communication terminal 20-1 are displayed at the right end of its display. On the other hand, characters L2 for the communication terminal 20-2 are displayed at the left end of its display. Note that while FIG. 13 gives the exemplary forms where each of the PTT call start requesting buttons B1 is displayed at the lower left part of the corresponding display, there is no limitation to the position for displaying the PTT call start requesting button B1. Where to arrange the button may be freely determined as long as such a layout allows for user's easy tap operations.

Figure 14:
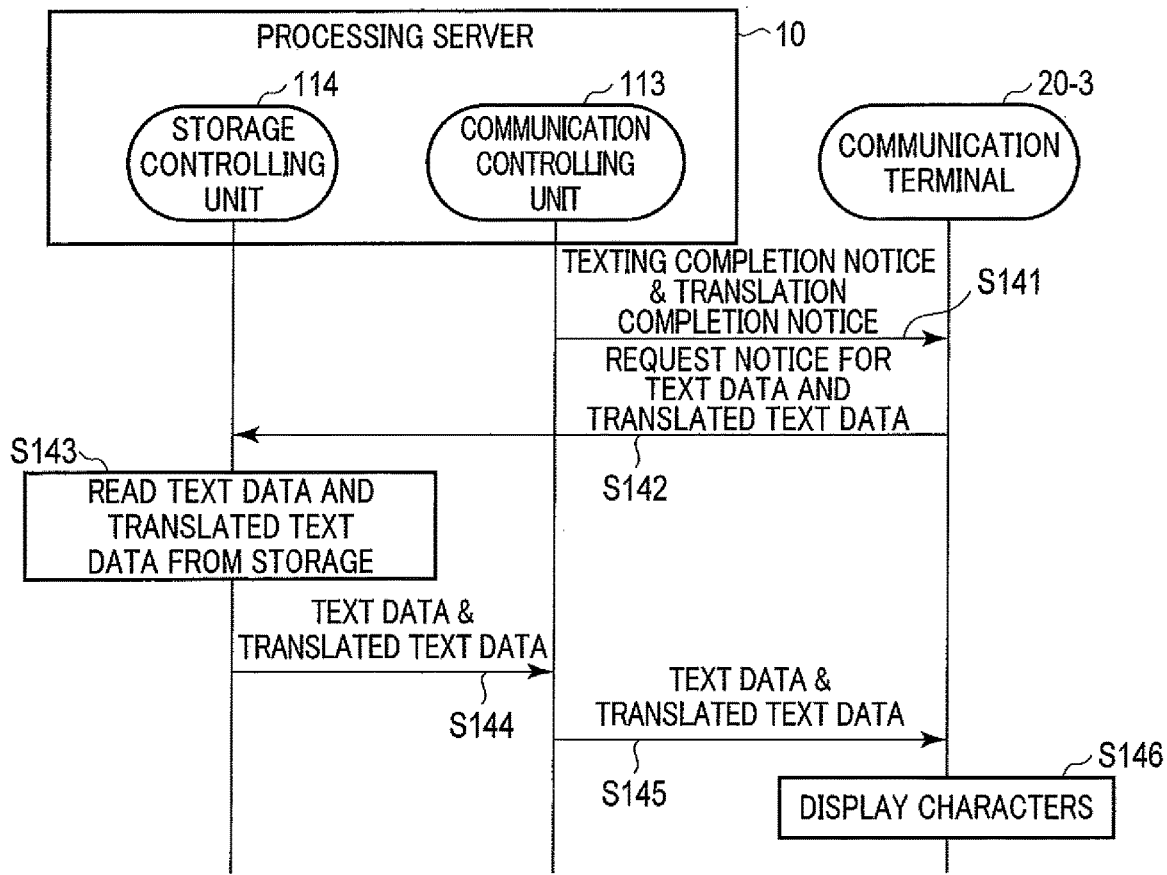
FIG. 14 is a diagram for explaining operations of the processing server and each communication terminal appearing in FIG. 1, for the communication terminal to cause its display to display characters corresponding to text data and translated text data.

FIG. 14 is a diagram for explaining exemplary operations of the processing server 10 and the communication terminal 20-3 appearing in FIG. 1, for the communication terminal 20-3 to cause its display to display the characters based on text data and translated text data. The explanation with reference to FIG. 14 will assume an instance where the first display mode is set.

The communication terminal 20-3, for which the language code different from that for the communication terminal 20-1 is set, receives a texting completion notice and a translation completion notice from the processing server 10 (step S141). The texting completion notice here contains the text ID of the text data after completion of the texting processing. Also, the translation completion notice contains the text ID of the translated text data after completion of the translation processing, as well as the language code used in the translation processing. Note that the explanation with reference to FIG. 14 follows the explanation with reference to FIG. 8, so that it will be supposed that the texting completion notice contains the text ID "Text01". It will also be supposed that the translation completion notice contains the text ID "Text01" and the language code "Language Code 02".

In response to receiving the texting completion notice and the translation completion notice, the communication controlling unit 211 of the communication terminal 20-3 transmits a request notice indicative of a request for the text data containing the text ID "Text01", and also for the translated text data containing the text ID "Text01" and the language code "Language Code 02", to the processing server 10 via the base station 30-2 and the network NW (step S142). The request notice here is labeled the user ID "User03" of the communication terminal 20-3 as the requestor.

Upon receipt of this request notice, the storage controlling unit 114 of the processing server 10 reads the text data containing the text ID "Text01" and the translated text data containing the text ID "Text01" and the language code "Language Code 02" from the storage 12 (step S143). The communication controlling unit 113 of the processing server 10 converts the text data and the translated text data, read from the storage 12, into packet-form data (step S144). The communication controlling unit 113 generates a duplicate of the data obtained through the packet-form conversion, according to the number of the user ID appended to the request notice. The communication controlling unit 113 transmits the duplicate of the data to the IP address specified based on the user ID (step S145). In this manner, the text data and the translated text data after the conversion into a packet form are transmitted to the communication terminal 20-3.

In response to receiving the text data and the translated text data from the processing server 10, the storage controlling unit 212 of the communication terminal 20-3 stores the received text data and the received translated text data in the RAM. The display controlling unit 213 of the communication terminal 20-3 reads the text main data and the translated text main data of the respective text data and translated text data stored in the RAM. The display controlling unit 213 displays characters based on these text main data and translated text main data, as the characters corresponding to the voice ID "Talk01", on the display screen for the talk group G1 identified by the talk group ID "Group01" (step S146).

FIG. 15 is a schematic diagram showing an example of how the characters are displayed on the communication terminal 20-3, after the processing as explained with reference to FIG. 14. As seen from FIG. 15, characters L3 are displayed at the left end of the display of the communication terminal 20-3 as a receiver terminal. The characters L3 are constituted by the characters based on the text main data and the characters based on the translated text main data. Note that the characters based on the text main data and the characters based on the translated text main data are not required to be displayed in a single area. For example, these characters may be displayed in different areas.

The exemplary operations shown in FIG. 14 have been explained, assuming that the communication terminal 20-3 receives the texting completion notice and the translation completion notice at the same time. However, as explained in relation to the exemplary operations shown in FIG. 8, the transmission of the translation completion notice may be performed behindhand of the transmission of the texting completion notice. In such cases, the communication controlling unit 211 of the communication terminal 20-3 may forgo transmission of a request notice of requesting the text data to the processing server 10 in response to the receipt of the texting completion notice, but may wait for the receipt of the translation completion notice and then transmit a request notice of requesting both the text data and the translated text data.

On the occasions of the translation completion notice arriving after the texting completion notice, it is also possible for the communication controlling unit 211 of the communication terminal 20-3 to transmit a request notice of requesting the text data to the processing server 10 in response to the receipt of the texting completion notice, and transmit a request notice of requesting the translated text data to the processing server 10 in response to the receipt of the translation completion notice.

Next, description will be given of the operations in an instance where the second display mode is set. FIG. 16 is a diagram for explaining exemplary operations of the processing server 10 and the communication terminals 20-1 and 20-2 appearing in FIG. 1, for the communication terminals 20-1 and 20-2 to cause their respective displays to display the characters corresponding to voices.

The communication terminal 20-1 with the transmission right, and the communication terminal 20-2 for which the same language code as that for the communication terminal 20-1 is set, receive a texting completion notice from the processing server 10 (step S161). The explanation with reference to FIG. 16 will suppose that the texting completion notice contains the text ID "Text06".

Upon receipt of the texting completion notice, the display controlling unit 213 of each of the communication terminals 20-1 and 20-2 causes the own display to display an indication of the completion of the texting processing in such a manner that the indication does not overlap with the PTT call start requesting button currently displayed (step S162). FIG. 17 is a schematic diagram showing an example of how the texting completion indication is displayed by the communication terminals 20-1 and 20-2 appearing in FIG. 1. In the example shown in FIG. 17, the indication of the completion of the texting processing is presented as a message "You have unread text". Note that the texting completion indication may instead be given as a symbol, etc. Also, while FIG. 17 shows the exemplary form where a PTT call start requesting button B2 is displayed at the central part of the display, there is no limitation to the position for displaying the PTT call start requesting button B2. Where to arrange the button may be freely determined as long as such a layout allows for user's easy tap operations.

The users of the respective communication terminals 20-1 and 20-2, upon recognizing the texting completion indication displayed on the own display, determine whether or not the characters corresponding to voices need to be displayed. If it is determined that the display of the characters is needed, each of the users inputs a request for displaying the characters via the input interface 23 (step S163). For example, each user may tap the region on the display, where the texting completion indication is displayed.

In response to the user's input of the request for displaying the characters, the communication controlling unit 211 of the communication terminal 20-1 transmits a display start request notice indicative of a request for starting character display from the text data containing the text ID "Text06", to the processing server 10 via the base station 30-1 and the network NW. The display start request notice here is labeled the user ID "User01" of the communication terminal 20-1 as the requestor. Meanwhile, in response to its user's input of the request for displaying the characters, the communication controlling unit 211 of the communication terminal 20-2 also transmits a display start request notice indicative of a request for starting character display from the text data containing the text ID "Text06", together with the user ID "User02" of the communication terminal 20-2, to the processing server 10 (step S164).

The storage controlling unit 114 of the processing server 10, upon receipt of the display start request notices, reads the text data containing the text ID "Text06" from the storage 12, and acquires, for example, the talk group ID contained in the read text data. The storage controlling unit 114 reads items of the text data, each containing the same talk group ID as the acquired talk group ID, from the storage 12 as much as a preset data amount (step S165). The preset data amount here may be, for example, a preset number of the text data items which were stored concurrently with or prior to the item of the text data containing the text ID "Text06". Consequently, in the present exemplary case, the text data items containing the respective text IDs "Text01" to "Text06" are read from the storage 12.

The communication controlling unit 113 of the processing server 10 sequentially converts the multiple text data items read from the storage 12 into packet-form data (step S166). The communication controlling unit 113 generates duplicates of the data obtained through the packet-form conversion, as many as the number of the user IDs appended to the display start request notices. The communication controlling unit 113 transmits the duplicates of the data to the IP addresses specified based on the user IDs (step S167). In this manner, the multiple text data items, having been converted into a packet form, are transmitted to the communication terminals 20-1 and 20-2.

In response to receiving the multiple text data items from the processing server 10, the storage controlling unit 212 of each of the communication terminals 20-1 and 20-2 sequentially stores the received text data items in the own RAM. The display controlling unit 213 of each of the communication terminals 20-1 and 20-2, upon storage of the text data items in the RAM, reads the text main data of each text data. The display controlling unit 213 displays characters based on the read text main data on the display screen for the talk group identified by the given talk group ID (step S168).

Note that the explanation with reference to the exemplary operations shown in FIG. 16 has assumed an instance where the texting completion notice is received by the communication terminals 20-1 and 20-3 participating in the talk group G1. This is not a limitation. The texting completion notice may also be transmitted to communication terminals which are not currently participating in the talk group G1 but which are eligible to participate in the talk group G1. When the texting completion notice is transmitted to a communication terminal which is eligible to participate in the talk group G1 but not yet an actual participant, the indication of the completion of the texting processing for the talk group G1 may be presented in this communication terminal as, for example, a message "You have unread text for talk group G1". The indication of the completion of the texting processing for the talk group G1 may instead be given as a symbol, etc., at the position on the communication terminal's display, set for the talk group G1. The user is thereby allowed to check the contents of the calls in the talk groups it can participate in, through the corresponding characters, even if the user is not the actual participant of such talk groups. Optionally, when a user as a non-participant in the talk group G1 checks the contents of a call in the talk group G1 through characters, this user may be admitted to the talk group G1.

FIG. 18 is a diagram for explaining exemplary operations of the processing server 10 and the communication terminal 20-3 appearing in FIG. 1, for the communication terminal 20-3 to cause its display to display the characters based on text data and translated text data.

In FIG. 18, the communication terminal 20-3, for which the language code different from that for the communication terminal 20-1 is set, receives a texting completion notice and a translation completion notice from the processing server 10 (step S181). The explanation with reference to FIG. 18 will suppose that the texting completion notice contains the text ID "Text06". It will also be supposed that the translation completion notice contains the text ID "Text06" and the language code "Language Code 02".

Upon receipt of the texting completion notice and the translation completion notice, the display controlling unit 213 of the communication terminal 20-3 causes the display to display an indication of the completion of the texting processing and the translation processing in such a manner that the indication does not overlap with the PTT call start requesting button currently displayed (step S182).

Note that, as explained in relation to the exemplary operations shown in FIG. 8, there may be cases where the communication terminal 20-3 receives the texting completion notice and the translation completion notice at the same time, and where the communication terminal 20-3 receives the translation completion notice after the texting completion notice. If the texting completion notice and the translation completion notice are received at once, the display controlling unit 213 of the communication terminal 20-3 displays, in response to their receipt, an indication of the completion of the texting processing and an indication of the completion of the translation processing. In this case, a form or setting may be adopted so that the display of only the texting completion indication by the display controlling unit 213 will be construed as informing that the translation processing has also been completed.

If the translation completion notice is received after the texting completion notice, the display controlling unit 213 of the communication terminal 20-3 may display the texting completion indication in response to the receipt of the texting completion notice, and display the translation completion indication in response to the receipt of the translation completion notice. Also, the display controlling unit 213 may forgo the display of the texting completion indication in response to the receipt of the texting completion notice, but may display the texting completion indication and the translation completion indication upon receipt of the translation completion notice. Here, a form or setting may be adopted so that the display of only the texting completion indication by the display controlling unit 213 will be construed as informing that the translation processing has also been completed.

Upon recognizing the texting completion indication displayed on the display, or both the texting completion indication and the translation completion indication displayed on the display, the user of the communication terminal 20-3 determines whether or not the characters corresponding to voices and a translation of these characters need to be displayed. If it is determined that the display of the characters and the translation is needed, the user inputs a request for displaying the characters and the translation via the input interface 23 (step S183). For example, the user may tap the region on the display, where the texting completion indication and the translation completion indication are displayed.

In response to the user's input of the request for displaying the characters and the translation, the communication controlling unit 211 of the communication terminal 20-3 transmits a display start request notice indicative of a request for starting character display from the text data containing the text ID "Text06", and also for starting character display from the translated text data containing the text ID "Text06" and the language code "Language Code 02", to the processing server 10 via the base station 30-2 and the network NW (step S184). The display start request notice here is labeled the user ID "User03" of the communication terminal 20-3 as the requestor.

The storage controlling unit 114 of the processing server 10, upon receipt of the display start request notice, reads the text data containing the text ID "Text06" from the storage 12, and acquires, for example, the talk group ID contained in the read text data. The storage controlling unit 114 reads items of the text data, each containing the same talk group ID as the acquired talk group ID, from the storage 12 as much as a preset data amount. The preset data amount here may be, for example, a preset number of the text data items which were stored concurrently with or prior to the item of the text data containing the text ID "Text06". Consequently, in the present exemplary case, the text data items containing the respective text IDs "Text01" to "Text06" are read from the storage 12. The storage controlling unit 114 also reads items of the translated text data, containing the same text IDs as the read text data items, respectively, and also containing the language code "Language Code 02", from the storage 12 (step S185). That is, in this exemplary case, the translated text data items containing the respective text IDs "Text01" to "Text06" and the language code "Language Code 02" are read from the storage 12.

The communication controlling unit 113 of the processing server 10 converts the text data and the translated text data, read from the storage 12, sequentially into packet-form data (step S186). The communication controlling unit 113 generates a duplicate of the data obtained through the packet-form conversion, according to the number of the user ID appended to the display start request notice. The communication controlling unit 113 transmits the duplicate of the data to the IP address specified based on the user ID (step S187). In this manner, the multiple text data items and the multiple translated text data items, having been converted into a packet form, are transmitted to the communication terminal 20-3.

In response to receiving the multiple text data items and the multiple translated text data items from the processing server 10, the storage controlling unit 212 of the communication terminal 20-3 sequentially stores the received text data items and the received translated text data items in the RAM. The display controlling unit 213 of the communication terminal 20-3 reads the text main data and the translated text main data of the respective text data and translated text data which have been stored in the RAM and which are labeled the same text ID. The display controlling unit 213 displays characters based on the read text main data and the read translated text main data on the display screen for the talk group identified by the given talk group ID (step S188).

Note that the explanations of the exemplary operations shown in FIG. 14 and FIG. 18 have assumed the instances where the processing server 10 transmits the texting completion notice and the translation completion notice to the communication terminal 20-3 with a setting of the language different from that for the communication terminal 20-1 possessing the transmission right. However, this is not a limitation. The processing server 10 may occasionally transmit only the translation completion notice to the communication terminal 20-3. In such cases, the display of the communication terminal 20-3 may present only the characters based on the translated text data.

Now, description will be given of the reproduction of voices corresponding to the characters displayed on the display of each communication terminal, for example, each of the communication terminals 20-1 and 20-2.

FIG. 19 is a diagram for explaining exemplary operations of the processing server 10 and the communication terminals, e.g., the communication terminals 20-1 and 20-2, shown in FIG. 1, for the communication terminals 20-1 and 20-2 to reproduce voices corresponding to the characters displayed on their respective displays.

First, it will be supposed that characters are currently displayed on each of the displays of the communication terminals 20-1 and 20-2 (step S191). The explanation with reference to FIG. 19 assumes that the text data for the characters displayed on the displays contains the voice ID "Talk01" and the call ID "0". If the users of the respective communication terminals 20-1 and 20-2 desire reproduction of voices corresponding to the characters displayed on the own display, the users input a reproduction request related to the characters via the own input interface 23 (step S192). For example, each of the users may tap the region on the display, where the subject characters are displayed.

In response to the user's input of this reproduction request for voices corresponding to the characters, the communication controlling unit 211 of the communication terminal 20-1 transmits a reproduction request notice indicative of a request for reproducing the call data containing the voice ID "Talk01" and the call ID "0", to the processing server 10 via the base station 30-1 and the network NW. The reproduction request notice here is labeled the user ID "User01" of the communication terminal 20-1 as the requestor. Meanwhile, in response to its user's input of the reproduction request for voices corresponding to the characters, the communication controlling unit 211 of the communication terminal 20-2 also transmits a reproduction request notice indicative of a request for reproducing the call data containing the voice ID "Talk01" and the call ID "0", together with the user ID "User02" of the communication terminal 20-2, to the processing server 10 (step S193).

Upon receipt of the reproduction request notices, the storage controlling unit 114 of the processing server 10 reads the call data containing the voice ID "Talk01" and the call ID "0" from the storage 12 (step S194). The communication controlling unit 113 of the processing server 10 modifies the structure of the call data read from the storage 12 as needed, and converts the data into packet-form data (step S195). The communication controlling unit 113 generates duplicates of the data obtained through the packet-form conversion, as many as the number of the requestors. The communication controlling unit 113 transmits the duplicates of the data to the IP addresses specified based on the user IDs (step S196). In this manner, the call data after the conversion into a packet form is transmitted to the communication terminals 20-1 and 20-2.

Upon receipt of the call data from the processing server 10, the storage controlling unit 212 of each of the communication terminals 20-1 and 20-2 stores the received call data in the own RAM. The reproduction controlling unit 214 of each of the communication terminals 20-1 and 20-2 reads the main data of the call data stored in the RAM, and controls the own speaker based on the read main data (step S197).

Next, description will be given of the processing of the communication terminal 20-1 with the transmission right, for correcting the characters corresponding to voices.

Figure 20:
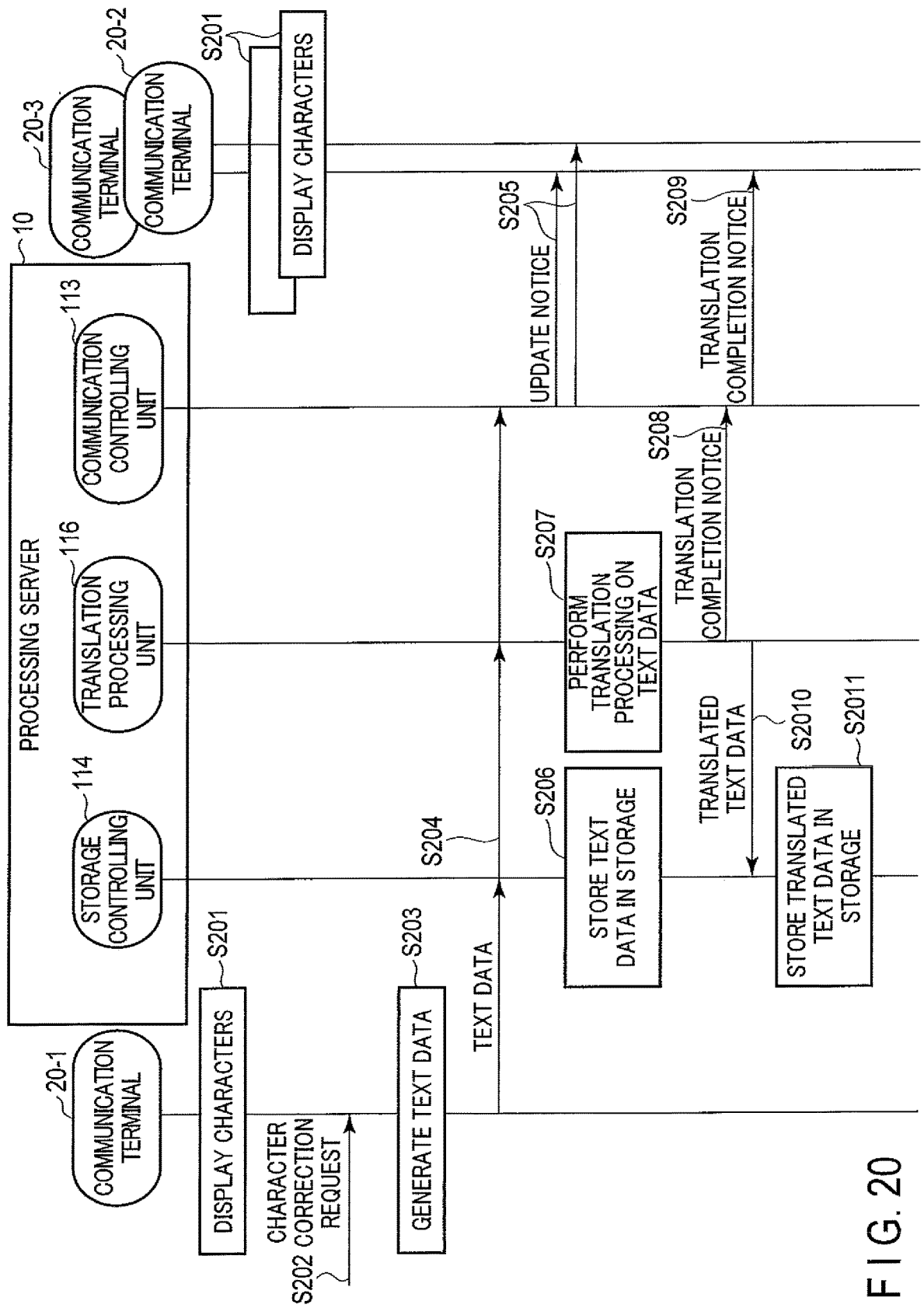
FIG. 20 is a diagram for explaining operations of the processing server and the communication terminal appearing in FIG. 1, for the communication terminal to correct characters displayed on the display.

FIG. 20 is a diagram for explaining exemplary operations of the processing server 10 and the communication terminal 20-1 appearing in FIG. 1, for the communication terminal 20-1 to correct the characters displayed on the display.

First, it will be supposed that characters are currently displayed on the display of the communication terminal 20-1 with the transmission right, as well as on each of the displays of the communication terminals 20-2 and 20-3 participating in the same talk group G1 as the communication terminal 20-1 (step S201). The explanation with reference to FIG. 20 assumes that these characters are displayed based on the text data containing the talk group ID "Group01" and the text ID "Text01".

The user of the communication terminal 20-1 views the characters displayed on the display, and determines whether or not a correction to the characters is necessary. If it is determined that a correction to the characters is necessary, the user inputs a request for correcting the characters via the input interface 23 (step S202). For example, the user may tap the region on the display, where the characters are displayed.

In response to the user's input of the character correction request, the correction controlling unit 216 of the communication terminal 20-1 generates text data containing corrected text main data (step S203). More specifically, and for example, upon receipt of the input of the character correction request from the user, the correction controlling unit 216 determines whether or not the characters targeted by the input character correction request belong to the call for which the own terminal is in possession of the transmission right, by referring to the talk group ID contained in the corresponding text data. If it is determined that the characters targeted by the character correction request belong to the call for which the own terminal is in possession of the transmission right, the correction controlling unit 216 causes the display to display a correction form for correcting the characters. The correction controlling unit 216 corrects the characters displayed on the display, according to the entries made through this correction form. The correction controlling unit 216 puts the corrected text main data into text data containing the talk group ID, the text ID, the voice ID, and the call ID, which are the same as the respective IDs in the text data for the characters before the correction. The communication controlling unit 211 of the communication terminal 20-1 modifies the structure of the text data containing the corrected text main data as needed, converts the data into packet-form data, and transmits it to the processing server 10 (step S204).

The communication controlling unit 113 of the processing server 10, upon receipt of the text data from the communication terminal 20-1, extracts the talk group ID "Group01" and the text ID "Text01" from the received text data. The communication controlling unit 113 notifies the communication terminals 20-2 and 20-3 held by the respective "User02" and "User03" participating in the talk group G1 identified by the extracted talk group ID "Group01", of the update of the display of characters based on the text data containing the text ID "Text01" (step S205).

Also, upon receipt of the text data from the communication terminal 20-1, the storage controlling unit 114 of the processing server 10 extracts the text ID "Text01" from the received text data. The storage controlling unit 114 deletes the presently stored text data containing the text ID "Text01" from the storage 12, and stores the received text data in the storage 12 (step S206).

Further, upon receipt of the text data from the communication terminal 20-1, the translation processing unit 116 of the processing server 10 generates translated text data by performing translation processing for the language corresponding to, for example, the "language Code 02" on the received text data (step S207). Upon generation of the translated text data, the translation processing unit 116 notifies the communication controlling unit 113 of the completion of the translation processing (step S208). In response to being notified of the completion of the translation processing, the communication controlling unit 113 transmits a notice indicative of the completion of the translation processing to the communication terminal 20-3 held by the "User03", for which the language code different from that for the "User01" is set (step S209). The generated translated text data is output to the storage controlling unit 114 (step S2010). The storage controlling unit 114 deletes the presently stored translated text data containing the text ID "Text01" and the language code "Language Code 02" from the storage 12, and stores the translated text data generated by the translation processing unit 116 in the storage 12 (step S2011).

Figure 21:
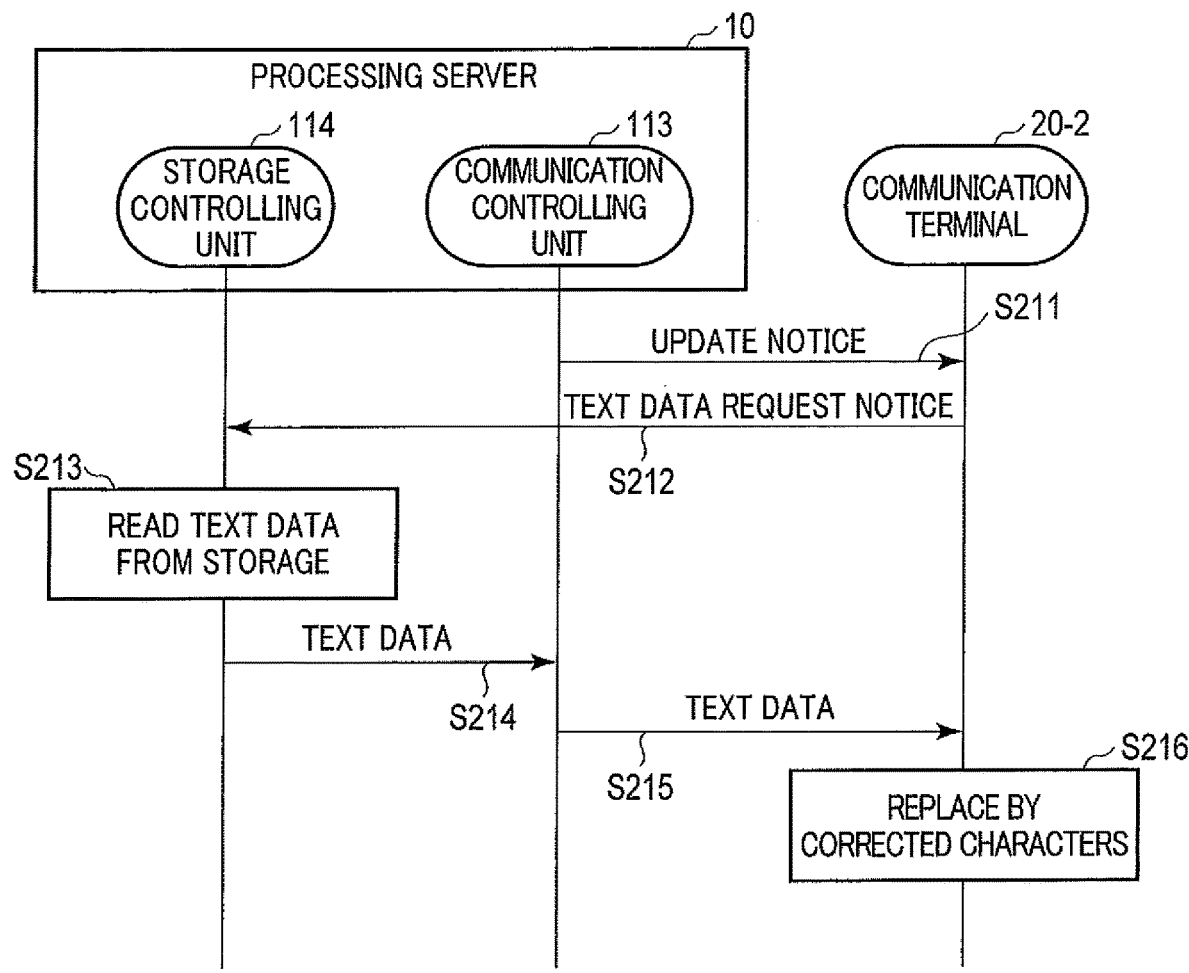
FIG. 21 is a diagram for explaining operations of the processing server and each communication terminal appearing in FIG. 1, for the communication terminal to cause its display to display corrected characters.

FIG. 21 is a diagram for explaining exemplary operations of the processing server 10 and the communication terminal 20-2 appearing in FIG. 1, for the communication terminal 20-2 to cause its display to display the characters having been corrected by the communication terminal 20-1. The explanation with reference to FIG. 21 will assume an instance where the first display mode is set.

The communication terminal 20-2, for which the same language code as that for the communication terminal 20-1 is set, receives an update notice from the processing server 10 (step S211). The update notice here contains the text ID of the corrected text data. Note that the explanation with reference to FIG. 21 follows the explanation with reference to FIG. 20, so that it will be supposed that the update notice contains the text ID "Text01". In response to receiving the update notice, the communication controlling unit 211 of the communication terminal 20-2 transmits a text data request notice indicative of a request for the text data containing the text ID "Text01" to the processing server 10 (step S212). The text data request notice here is labeled the user ID "User02" of the communication terminal 20-2 as the requestor.

Upon receipt of the text data request notice, the storage controlling unit 114 of the processing server 10 reads the text data containing the text ID "Text01" from the storage 12 (step S213). The communication controlling unit 113 of the processing server 10 converts the text data read from the storage 12 into packet-form data (step S214). The communication controlling unit 113 generates a duplicate of the data obtained through the packet-form conversion, according to the number of the user ID appended to the text data request notice. The communication controlling unit 113 transmits the duplicate of the data to the IP address specified based on the user ID (step S215). In this manner, the text data after the conversion into a packet form is transmitted to the communication terminal 20-2.

In response to receiving the text data from the processing server 10, the storage controlling unit 212 of the communication terminal 20-2 stores the received text data in the RAM. The storage controlling unit 212, upon storing the text data in the RAM, extracts the text ID "Text01" from the stored text data. With reference to the extracted text ID "Text01", the storage controlling unit 212 deletes the text data previously stored in the RAM and containing the text ID "Text01". In this way, the text data before the correction is cleared from the RAM. The display controlling unit 213 of the communication terminal 20-2 reads the text main data of the text data newly stored in the RAM. The display controlling unit 213 displays characters based on the read text main data as the characters corresponding to the voice ID "Talk01", on the display screen for the talk group G1 identified by the talk group ID "Group01" (step S216). In this manner, the currently displayed characters, which are based on the text data before the correction, are replaced by the characters based on the received text data.

FIG. 22 is a diagram for explaining exemplary operations of the processing server 10 and the communication terminal 20-3 appearing in FIG. 1, for the communication terminal 20-3 to cause its display to display the characters having been corrected by the communication terminal 20-1. The explanation with reference to FIG. 22 will assume an instance where the first display mode is set.

The communication terminal 20-3, for which the language code different from that for the communication terminal 20-1 is set, receives an update notice and a translation completion notice from the processing server 10 (step S221). The update notice here contains the text ID of the corrected text data. Also, the translation completion notice contains the text ID of the translated text data after completion of the translation processing, as well as the language code for the translated text data. Note that the explanation with reference to FIG. 22 follows the explanation with reference to FIG. 20, so that it will be supposed that the update notice contains the text ID "Text01". It will also be supposed that the translation completion notice contains the text ID "Text01" and the language code "Language Code 02".

In response to receiving the update notice and the translation completion notice, the communication controlling unit 211 of the communication terminal 20-3 transmits a request notice indicative of a request for the text data containing the text ID "Text01", and also for the translated text data containing the text ID "Text01" and the language code "Language Code 02", to the processing server 10 (step S222). The request notice here is labeled the user ID "User03" of the communication terminal 20-3 as the requestor.

Upon receipt of this request notice, the storage controlling unit 114 of the processing server 10 reads the text data containing the text ID "Text01" and the translated text data containing the text ID "Text01" and the language code "Language Code 02" from the storage 12 (step S223). The communication controlling unit 113 of the processing server 10 converts the text data and the translated text data, read from the storage 12, into packet-form data (step S224). The communication controlling unit 113 generates a duplicate of the data obtained through the packet-form conversion, according to the number of the user ID appended to the request notice. The communication controlling unit 113 transmits the duplicate of the data to the IP address specified based on the user ID (step S225). In this manner, the text data and the translated text data after the conversion into a packet form are transmitted to the communication terminal 20-3.

In response to receiving the text data and the translated text data from the processing server 10, the storage controlling unit 212 of the communication terminal 20-3 stores the received text data and the received translated text data in the RAM. The storage controlling unit 212, upon storing the text data and the translated text data in the RAM, extracts the text ID "Text01" and the language code "Language Code 02" from the stored text data and the stored translated text data. With reference to the extracted text ID "Text01" and the extracted language code "Language Code 02", the storage controlling unit 212 deletes the text data previously stored in the RAM and containing the text ID "Text01", and also deletes the translated text data previously stored in the RAM and containing the text ID "Text01" and the language code "Language Code 02". In this way, the text data before the correction, and its corresponding translated text data are cleared from the RAM. The display controlling unit 213 of the communication terminal 20-3 reads the text main data and the translated text main data of the respective text data and translated text data newly stored in the RAM. The display controlling unit 213 displays characters based on these text main data and translated text main data, as the characters corresponding to the voice ID "Talk01", on the display screen for the talk group G1 identified by the talk group ID "Group01" (step S226). In this manner, the currently displayed characters, which are based on the text data and the translated text data before the correction, are replaced by the characters based on the received text data and the received translated text data.

As described above, according to the embodiments, the texting processing unit 115 of the processing server 10 is adapted to generate text data based on the voice data transmitted from the communication terminal 20-1 possessing the transmission right. The communication controlling unit 113 of the processing server 10 is adapted to then transmit the generated text data to the communication terminals 20-1 to 20-3 participating in the talk group G1. This configuration allows the users of the communication terminals 20-1 to 20-m, participating in a talk group, to check the contents of a call using the display of characters as the call converted into a text form. The configuration also allows users who are surrounded by an environment not permitting comfortable listening of voices, or users who have difficulties in hearing voices, to check the contents of the call.

Therefore, the communication system 1 and the processing server 10 according to the embodiments can reduce the miscommunication of information.

Also according to the embodiments, the texting processing unit 115 of the processing server 10 is adapted to generate text data based on multiple items of voice data retained in the cache memory. With this configuration, the processing server 10 can generate text data while maintaining the quality of voice communications.

Also according to the embodiments, the texting processing unit 115 of the processing server 10 is adapted to generate, in response to voice data retained in the cache memory reaching the predetermined volume, or in response to the release of the transmission right from the communication terminal 20-1 before the voice data reaching the predetermined volume, text data based on the multiple voice data items retained in the cache memory. In other words, a long call is sectioned into portions of a certain length of time and converted into text forms. With this configuration, the processing server 10 can generate text data while minimizing the delay from the voice data. The configuration can also enable sequential texting processing of the voice data, even during a long, ongoing call of a caller.

According to the embodiments, the storage controlling unit 114 of the processing server 10 is adapted to store the generated text data in the storage 12. The texting processing unit 115, in response to the generation of the text data, gives a notice indicative of the completion of the texting processing to the communication terminals 20-1 to 20-3 participating in the talk group G1. The communication terminals in receipt of this texting completion notice return a text data request notice, and the communication controlling unit 113 is adapted to then transmit, in response to the text data request notice, the text data stored in the storage 12 to the requestor communication terminals. With this configuration, the processing server 10 enables the communication terminals 20-1 to 20-*m* to display the characters based on the text data on their respective displays, without requiring them to store the text data in the own storages 22. As such, since the communication terminals 20-1 to 20-*m* do not keep text data in their storages, information leakage can be prevented.

Also according to the embodiments, the communication controlling unit 113 of the processing server 10 is adapted so that, when the communication terminal which has received a texting completion notice returns a display start request notice indicative of a request for starting character display based on the text data, the communication controlling unit 113 transmits multiple text data items previously stored in the storage 12 to the requestor communication terminal. With this configuration, the users of the communication terminals 20-1 to 20-*m* can check the flow of calls through corresponding characters, even if the users participate in a talk group in the middle of the ongoing talk or the users start character display for voices from the middle of the calls.

According to the embodiments, the storage controlling unit 114 of the processing server 10 is adapted to store the voice data used for generating text data, in the storage 12 as call data. The communication controlling unit 113 is adapted so that, when the communication terminal which has received the text data returns a reproduction request for voices corresponding to the text data, the communication controlling unit 113 transmits the call data corresponding to the text data requested for reproduction, among the set of call data stored in the storage 12, to the communication terminal as the reproduction requestor. With this configuration, the users of the communication terminals 20-1 to 20-*m* can listen to the actual call corresponding to the characters displayed on their respective displays, at any desired timing. Moreover, even if the characters on the display involve an error, the users are allowed to verify the call contents for accuracy.

According to the embodiments, the communication controlling unit 113 of the processing server 10 is adapted so that, when text data is corrected by the communication terminal 20-1 with the transmission right, the communication controlling unit 113 transmits the corrected text data to the communication terminals 20-2 and 20-3 participating in the talk group G1. With this configuration, therefore, even in case the texting processing of call data by the texting processing unit 115 involved a misconversion, etc., the user who made the call can correct the corresponding characters displayed by the own communication terminal, and have other communication terminals reflect the correction on their characters.

According to the embodiments, the communication controlling unit 113 of the processing server 10 is adapted so that, when text data is corrected by the communication terminal 20-1 with the transmission right, the communication controlling unit 113 sends a notice indicative of the update of display to the communication terminals 20-2 and 20-3 participating in the talk group G1. Then, when the communication terminals 20 which have received the update notice return a request for transmission of the corrected text data, the communication controlling unit 113 transmits the corrected text data stored in the storage 12 to the requestor communication terminals 20. With this configuration, the processing server 10 enables the communication terminals 20-1 to 20-*m* to display the characters based on the corrected text data on their respective displays, without requiring them to store the corrected text data in the own storages 22.

According to the embodiments, the translation processing unit 116 of the processing server 10 is adapted to generate translated text data by performing translation processing on the text data generated by the texting processing unit 115. The communication controlling unit 113 is adapted to then transmit the generated translated text data to, among the communication terminals 20-1 to 20-3 participating in the talk group G1, the communication terminal 20-3 with a setting of the language different from that for the communication terminal 20-1 possessing the transmission right. With this configuration, the users in a talk group, even having different language backgrounds, can all understand the contents of calls. That is, the configuration allows for multi-language communications.

According to the embodiments, the storage controlling unit 114 of the processing server 10 is adapted to store the translated text data generated by the translation processing unit 116 in the storage 12. The translation processing unit 116, in response to the generation of the translated text data, gives a notice indicative of the completion of the translation processing to, among the communication terminals 20-1 to 20-3 participating in the talk group G1, the communication terminal 20-3 with a setting of the language different from that for the communication terminal 20-1 possessing the transmission right. The communication controlling unit 113 is adapted so that, when the communication terminal 20-3 in receipt of this translation completion notice returns a request for transmission of the translated text data, the communication controlling unit 113 reads the requested translated text data from the storage 12 and transmits it to the communication terminal 20-3 as the requestor. With this configuration, the processing server 10 enables the communication terminals 20-1 to 20-*m* to display the characters based on the translated text data on their respective displays, without requiring them to store the translated text data in the own storages 22. As such, since the communication terminals 20-1 to 20-*m* do not keep translated text data in their storages, information leakage can be prevented.

According to the embodiments, the communication controlling unit 113 of the processing server 10 is adapted so that, when the communication terminal 20-3 which has received a translation completion notice returns a display start request notice indicative of a request for starting character display based on the translated text data, the communication controlling unit 113 transmits multiple translated text data items previously stored in the storage 12 to the communication terminal 20-3 as the requestor. With this configuration, the users of the communication terminals 20-1 to 20-*m* can check the flow of calls through corresponding characters after the translation, even if the users participate in a talk group in the middle of the ongoing talk or the users start character display for voices from the middle of the calls.

According to the embodiments, the translation processing unit 116 of the processing server 10 is adapted to also generate translated text data by performing translation processing on the text data having been corrected by the communication terminal with the transmission right. The communication controlling unit 113 is adapted to then transmit the translated text data for the corrected text data to, among the communication terminals 20-1 to 20-3 participating in the talk group G1, the communication terminal 20-3 with a setting of the language different from that for the communication terminal 20-1 possessing the transmission right. With this configuration, the processing server 10 can automatically translate the corrected text data, and send the translated text data reflecting the correction to each of the communication terminals 20, for which a language different from that for the communication terminal 20 with the transmission right is set.

According to the embodiments, the storage controlling unit 114 of the processing server 10 is adapted so that, when translated text data is generated for the text data corrected by the communication terminal 20-1 with the transmission right, the storage controlling unit 114 deletes the corresponding translated text data which is for the text data before the correction from the storage 12, and stores the generated translated text data for the corrected text data in the storage 12. The translation processing unit 116, in response to the generation of the translated text data for the text data corrected by the communication terminal 20-1, gives a notice indicative of the completion of the translation processing to, among the communication terminals 20-1 to 20-3 participating in the talk group G1, the communication terminal 20-3 with a setting of the language different from that for the communication terminal 20-1 possessing the transmission right. The communication controlling unit 113 is adapted so that, when the communication terminal 20-3 in receipt of this translation completion notice returns a request for transmission of the translated text data, the communication controlling unit 113 reads the requested translated text data from the storage 12 and transmits it to the communication terminal 20-3 as the requestor. With this configuration, the processing server 10 enables the communication terminals 20-1 to 20-m to display the characters based on the translated text data for the corrected text data on their respective displays, without requiring them to store this translated text data in the own storages 22.

Furthermore, according to the embodiments, the communication controlling unit 211 of each of the communication terminals 20-1 to 20-3 is adapted to receive a texting completion notice indicative of the completion of texting processing of the voice data having been transmitted from the communication terminal 20-1 with the transmission right. The communication controlling unit 211 is adapted to then request the processing server 10 to transmit the text data for which the completion of texting processing has been informed of by means of the received texting completion notice. The communication controlling unit 211 is adapted to then receive the text data returned from the processing server 10 according to the request. The display controlling unit 213 is adapted to cause the display as the own output interface 24 to display the characters based on the received text data. With this configuration, the users of the communication terminals 20-1 to 20-m, participating in a talk group, are allowed to check the contents of a call using the display of characters as the call converted into a text form. The configuration also allows users who are surrounded by an environment not permitting comfortable listening of voices, or users who have difficulties in hearing voices, to check the contents of the call.

Also according to the embodiments, the storage controlling unit 212 of each of the communication terminals 20-1 to 20-3 is adapted to store received text data in the own RAM as a volatile memory. The display controlling unit 213 is adapted to then cause the display to display the characters based on the text data stored in the RAM. With this configuration, the communication terminals 20-1 to 20-m can cause their respective displays to display the characters based on the text data, without storing the text data in the own storages 22.

According to the embodiments, the display controlling unit 213 of each of the communication terminals 20-1 and 20-3 is adapted to display an indication corresponding to a received texting completion notice, on the own display. The communication controlling unit 211 is adapted so that, when a request for displaying the characters is given in response to displaying this texting completion indication, the communication controlling unit 211 requests the processing server 10 to transmit the text data for which the texting completion notice has been sent. With this configuration, the communication terminals 20-1 to 20-m can each perform character display on the own display, only in the cases where the display of characters corresponding to voices is required.

According to the embodiments, the communication controlling unit 211 of each of the communication terminals 20-1 to 20-3 is adapted so that, when a request for reproducing voices corresponding to characters displayed on the own display is given, the communication controlling unit 211 requests the processing server 10 to transmit the voice data used for generating the text data. The communication controlling unit 211 is adapted to then receive the voice data returned from the processing server 10 according to the request. The reproduction controlling unit 214 is adapted to cause the speaker to reproduce the voices based on the received voice data. With this configuration, the users of the communication terminals 20-1 to 20-m can listen to the actual call corresponding to the characters displayed on their respective displays, at any desired timing. Moreover, even if the characters on the display involve an error, the users are allowed to verify the call contents for accuracy.

According to the embodiments, the correction controlling unit 216 of the communication terminal 20-1 is adapted so that, when a request for correcting characters displayed on the own display is given, the correction controlling unit 216 determines whether or not the characters targeted by the correction request belong to the call for which the own terminal is in possession of the transmission right. If it is determined that the characters targeted by the correction request belong to the call for which the own terminal is in possession of the transmission right, the correction controlling unit 216 causes the display to display a correction form for inputting the correction to the text data, and generates text data according to the correction input through this correction form. The text data generated by the correction controlling unit 216 is then transmitted to the processing server 10. With this configuration, even in case the texting processing involved a misconversion, etc., the user who made the call can correct the corresponding characters displayed by the own communication terminal.

According to the embodiments, the communication controlling unit 211 of each of the communication terminals 20-2 and 20-3 is adapted so that, when the communication terminal 20-1 with the transmission right corrects text data, the communication controlling unit 211 receives an update notice indicative of the update of display. The communication controlling unit 211 is adapted to then request the processing server 10 to transmit the corrected text data, in response to the received update notice. The communication controlling unit 211 is adapted to receive the text data returned from the processing server 10 according to the request. The display controlling unit 213 is adapted to replace the characters currently displayed on the own display, which are based on the text data before the correction, by the characters based on the received text data after the correction. With this configuration, the communication terminals 20-1 to 20-m can have their own displays present a display that reflects the corrections made to the text data by the communication terminal with the transmission right. Moreover, the communication terminals 20-1 to 20-m can cause their respective displays to display the characters based on the corrected text data, without storing this text data in the own storages 22.

According to the embodiments, the communication controlling unit 211 of each of the communication terminals 20-1 to 20-3 is adapted so that, when a language for use in the own terminal is set, the communication controlling unit 211 sends information for the set language to the processing server 10. The communication controlling unit 211 is adapted to receive a translation completion notice indicative of the completion of translation processing for text data. The communication controlling unit 211 is adapted to then request the processing server 10 to transmit the translated text data, in response to the received translation completion notice. The communication controlling unit 211 is adapted to receive the translated text data returned from the processing server 10. The display controlling unit 213 is adapted to cause the own display to display the characters based on the received translated text data. This configuration enables the communication terminals 20-1 to 20-$m$ to each display, if their respective users use a language different from the language for the communication terminal with the transmission right, the characters obtained through automatic translation of the corresponding voices.

According to the embodiments, the storage controlling unit 212 of the communication terminal 20-3 is adapted to store received translated text data in the RAM as a volatile memory. The display controlling unit 213 is adapted to cause the display to display the characters based on the translated text data stored in the volatile memory. With this configuration, the communication terminals 20-1 to 20-$m$ can cause their respective displays to display the characters based on the translated text data, without storing the text data in the own storages 22.

According to the embodiments, the display controlling unit 213 of the communication terminal 20-3 is adapted to display an indication corresponding to a received translation completion notice, on the own display. The communication controlling unit 211 is adapted so that, when a request for displaying the characters based on the translated text data is given in response to displaying this translation completion indication, the communication controlling unit 211 requests the processing server 10 to transmit the translated text data for which the translation completion notice has been sent. With this configuration, the communication terminals 20-1 to 20-$m$ can each perform character display on the own display, only in the cases where the display of characters based on translated text data is required.

According to the embodiments, the recitation controlling unit 215 of each communication terminal 20 is adapted so that, when a request for reciting characters which are based on translated text data and displayed on the own display is given, the recitation controlling unit 215 converts the characters based on the translated text data into voice data. The recitation controlling unit 215 is adapted to then cause the speaker to reproduce the voices based on the voice data obtained by the conversion. With this configuration, the communication terminals 20-1 to 20-$m$ can reproduce the contents of calls in a language different from the original language.

According to the embodiments, the communication controlling unit 211 of the communication terminal 20-3 is adapted to receive translated text data for corrected text data. The display controlling unit 213 is adapted to replace the characters currently displayed on the own display, which are based on translated text data for the text data before the correction, by the characters based on the received translated text data for the corrected text data. With this configuration, the communication terminals 20-1 to 20-$m$ can have the characters based on translated text data reflect the corrections having been made to the corresponding text data by the communication terminal with the transmission right.

Note that the foregoing descriptions of the embodiments have assumed instances where the storage controlling unit 114, in response to voice data in the cache memory reaching a predetermined volume, or in response to the release of the transmission right before the voice data reaching the predetermined volume, generates call data based on the multiple voice data items retained in the cache memory. However, this is not a limitation. For example, the storage controlling unit 114 may sequentially retain, in the cache memory, voice data transmitted from a communication terminal with the transmission right. Then, upon release of the transmission right, the storage controlling unit 114 may generate the call data based on the multiple voice data items retained in the cache memory and constituting one call. In this manner, the texting processing would be more accurately performed, since a call is not sectioned into portions.

In this relation, when call data is generated upon notification of the release of the transmission right, the call data is not required to secure the area for storing a call ID shown in FIG. 9, as no data sections are created for one call. As such, it is not necessary for the text data to secure the area for storing a call ID shown in FIG. 10, either.

Additionally, the foregoing embodiments tolerate configurations for the users of the communication terminals 20-1 to 20-$m$ to change the set languages. A set language may be changed by, for example, re-participation in the talk group. In an exemplary instance, the users of the respective communication terminals 20-1 to 20-$m$ may also switch the set language in the middle of the participation in the talk group. The communication terminals 20-1 to 20-$m$ may be adapted so that, upon occurrence of a switchover of the language to another language during the participation in the talk group, each of the communication terminals 20-1 to 20-$m$ transmits, to the processing server 10, a notice indicative of a request for sending translated text data prepared in the language after the switchover and corresponding to the text data having been received previously. This request notice contains, for example, the user ID of the requestor communication terminal, the language code for the language after the switchover, and the text ID of the text data for characters to be displayed.

The storage controlling unit 114 of the processing server 10 may be adapted so that, upon receipt of the notice requesting the translated text data in the language after the switchover, the storage controlling unit 114 reads the translated text data containing the desired text ID and language code from the storage 12. The communication controlling unit 113 of the processing server 10 is adapted to transmit the translated text data read from the storage 12 to the requestor communication terminal.

The storage controlling unit 212 of each of the communication terminals 20-1 to 20-$m$ may be adapted so that, upon receipt of the translated text data prepared in the language after the switchover, the storage controlling unit 212 stores the translated text data in the own RAM. The storage controlling unit 212, upon storing the translated text data in the RAM, extracts the text ID from the stored translated text data. With reference to the extracted text ID, the storage controlling unit 212 deletes the translated text data previously stored in the RAM and containing the same text ID. The display controlling unit 213 of each of the communication terminals 20-1 to 20-$m$ is adapted to then read the translated text main data of the translated text data newly stored in the own RAM. The display controlling unit 213 is adapted to display the characters based on the read translated text main data together with the characters based on the corresponding text main data. In this manner, the characters based on the translated text data before the language switchover are replaced by the characters based on the received translated text data.

Note that it is not necessarily required for the storage controlling unit 212 of each of the communication terminals 20-1 to 20-*m* to delete the translated text data containing the same ID from the RAM. The display controlling unit 213 of each of the communication terminals 20-1 to 20-*m* may be adapted to read the translated text main data of each of the translated text data items stored in the RAM. The display controlling unit 213 is adapted to then display the characters based on the read translated text main data together with the characters based on the corresponding text main data. With this configuration, the characters based on the translated text data after the language switchover are displayed together with the display having been presented up to the switchover.

While certain embodiments of the invention have been described, they have been presented by way of example only, and they are not intended to limit the scope of the invention.

What is claimed is:

1. A communication method performed by each of a plurality of communication terminals which are correlated as a group for performing one-to-many communications from one of the communication terminals in the group to remaining one or more of the communication terminals in the group, the communication method comprising:
receiving a texting completion notice indicative of completion of texting processing on voice data having been transmitted from one of the communication terminals;
transmitting, in response to the received texting completion notice, a request signal for requesting transmission of text data generated by the texting processing;
receiving the text data returned in response to the request signal;
causing a display to display a character based on the received text data; and
wherein the texting completion notice uniquely corresponds to the generated text data such that each text generated has a unique texting completion notice corresponding thereto, the texting completion notice including a unique identifier of the generated text data;
wherein the texting completion notice indicates that the processing for converting voice data into text is complete.

2. The communication method according to claim 1, further comprising:
accepting a setting of language for use;
transmitting information for the setting of the language;
receiving a translation completion notice indicative of completion of translation processing for the generated text data according to the language;
transmitting, in response to the received translation completion notice, a translation request signal for requesting transmission of translated text data generated by the translation processing;
receiving the translated text data returned in response to the translation request signal; and
causing the display to display a character based on the received translated text data.

3. The communication method according to claim 2, further comprising
storing the received translated text data in a volatile memory,
wherein the display is caused to display the character based on the translated text data stored in the volatile memory.

4. The communication method according to claim 2, further comprising:
causing the display to display an indication corresponding to the received translation completion notice; and
accepting a display request given in response to the indication corresponding to the translation completion notice and requesting display of the character based on the translated text data generated by the translation processing,
wherein the translation request signal is transmitted in response to the display request.

5. The communication method according to claim 2, further comprising:
accepting a recitation request for the character displayed on the display and based on the translated text data;
performing, in response to the recitation request, conversion of the character based on the translated text data into voice data; and
causing a speaker to reproduce a voice based on the voice data after the conversion.

6. The communication method according to claim 2, further comprising:
receiving translated text data for the text data with a correction;
replacing the character displayed on the display and based on the translated text data for the text data before the correction, by a character based on the received translated text data for the text data after the correction.

7. The communication method according to claim 2, further comprising:
accepting a switchover of the setting of the language for use;
transmitting a request signal for requesting transmission of the translated text data in another language set after the switchover;
receiving the translated text data returned in response to the request signal; and
causing the display to display a character based on the received translated text data after the switchover, together with or in place of the character based on the translated text data before the switchover.

8. The communication method according to claim 1, further comprising
storing the received text data in a volatile memory,
wherein the display is caused to display the character based on the text data stored in the volatile memory.

9. The communication method according to claim 1, further comprising:
causing the display to display an indication corresponding to the received texting completion notice; and
accepting a display request given in response to the indication corresponding to the texting completion notice and requesting display of the character based on the text data generated by the texting processing,
wherein the request signal is transmitted in response to the display request.

10. The communication method according to claim 1, further comprising:
accepting a reproduction request given in response to the character displayed on the display and requesting reproduction of a voice corresponding to the character;
transmitting, in response to the reproduction request, a voice request signal for requesting transmission of the voice data used for generating the text data;

receiving the voice data returned in response to the voice request signal; and causing a speaker to reproduce the voice based on the received voice data.

11. The communication method according to claim 1, further comprising:

accepting a correction request for the character displayed on the display;

determining whether or not the character targeted by the correction request belongs to a call for which the own communication terminal is in possession of a transmission right, wherein the transmission right is a right to transmit data;

causing the display to display a correction form for inputting a correction to the text data, in response to determining that the character targeted by the correction request belongs to the call for which the own communication terminal is in possession of the transmission right;

generating text data based on the input correction; and transmitting the generated text data.

12. The communication method according to claim 1, further comprising:

receiving, in response to said one of the communication terminals correcting the text data, an update notice indicative of update of display for the text data;

transmitting, in response to the received update notice, a request signal for requesting transmission of the corrected text data;

receiving the text data returned in response to the request signal; and replacing the character displayed on the display and based on the text data before the correction, by a character based on the received corrected text data.

13. A non-transitory computer readable storage medium storing a program which causes a processor of each of a plurality of communication terminals which are correlated as a group for performing one-to-many communications from one of the communication terminals in the group to remaining one or more of the communication terminals in the group to perform processing comprising:

receiving a texting completion notice indicative of completion of texting processing on voice data having been transmitted from one of the communication terminals;

transmitting, in response to the received texting completion notice, a request signal for requesting transmission of text data generated by the texting processing;

receiving the text data returned in response to the request signal;

causing a display to display a character based on the received text data; and wherein the texting completion notice uniquely corresponds to the generated text data such that each text generated has a unique texting completion notice corresponding thereto, the texting completion notice including a unique identifier of the generated text data;

wherein the texting completion notice indicates that the processing for converting voice data into text is complete.

* * * * *